(12) United States Patent
Honda et al.

(10) Patent No.: US 9,813,451 B2
(45) Date of Patent: Nov. 7, 2017

(54) APPARATUS AND METHOD FOR DETECTING CYBER ATTACKS FROM COMMUNICATION SOURCES

(71) Applicant: FUJITSU LIMITED, Kawasaki-shi, Kanagawa (JP)

(72) Inventors: Satomi Honda, Yokohama (JP); Masahiko Takenaka, Kawasaki (JP); Satoru Torii, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/803,503

(22) Filed: Jul. 20, 2015

(65) Prior Publication Data
US 2016/0057169 A1 Feb. 25, 2016

(30) Foreign Application Priority Data

Aug. 22, 2014 (JP) ................................ 2014-168892

(51) Int. Cl.
*G06F 17/00* (2006.01)
*H04L 29/06* (2006.01)

(52) U.S. Cl.
CPC ............ *H04L 63/20* (2013.01); *H04L 63/083* (2013.01); *H04L 63/1416* (2013.01); *H04L 63/1425* (2013.01)

(58) Field of Classification Search
CPC ............... H04L 63/083; H04L 63/1416; H04L 63/1425; H04L 63/20
USPC .......................................................... 726/1
See application file for complete search history.

(56) References Cited

U.S. PATENT DOCUMENTS

| | | | | |
|---|---|---|---|---|
| 8,312,540 | B1 * | 11/2012 | Kahn ..................... | G06F 21/552 713/183 |
| 9,571,508 | B2 * | 2/2017 | Singla ..................... | G06F 21/56 |
| 2003/0236995 | A1 * | 12/2003 | Fretwell, Jr. ........ | H04L 63/1416 726/25 |
| 2011/0185419 | A1 * | 7/2011 | Boteler ............... | H04L 63/1425 726/22 |
| 2014/0165200 | A1 * | 6/2014 | Singla ..................... | G06F 21/56 726/23 |

FOREIGN PATENT DOCUMENTS

| | | |
|---|---|---|
| JP | 2008-187701 | 8/2008 |
| JP | 2010-250607 | 11/2010 |
| WO | 2013/019198 A1 | 2/2013 |

OTHER PUBLICATIONS

Extended European Search Report dated Jan. 19, 2016 in related European Application No. 15178031.9.
European Office Action dated Jan. 12, 2017 in related European Application No. 15178031.9.

\* cited by examiner

*Primary Examiner* — Samson Lemma
(74) *Attorney, Agent, or Firm* — Staas & Halsey LLP

(57) ABSTRACT

An apparatus includes a memory, and a processor coupled to the memory and configured to specify a communication source device that performs a plurality of traffic confirmations of communications with a plurality of first devices, and control to discard a plurality of first authentication requests for the plurality of first devices generated by the communication source device after performing the plurality of traffic confirmations of communications.

13 Claims, 24 Drawing Sheets

FIG. 7
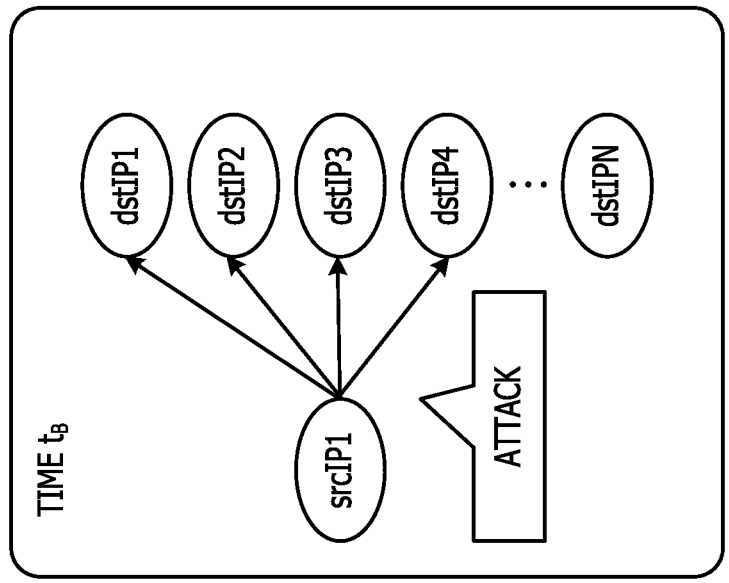
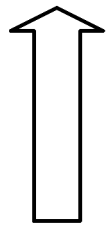
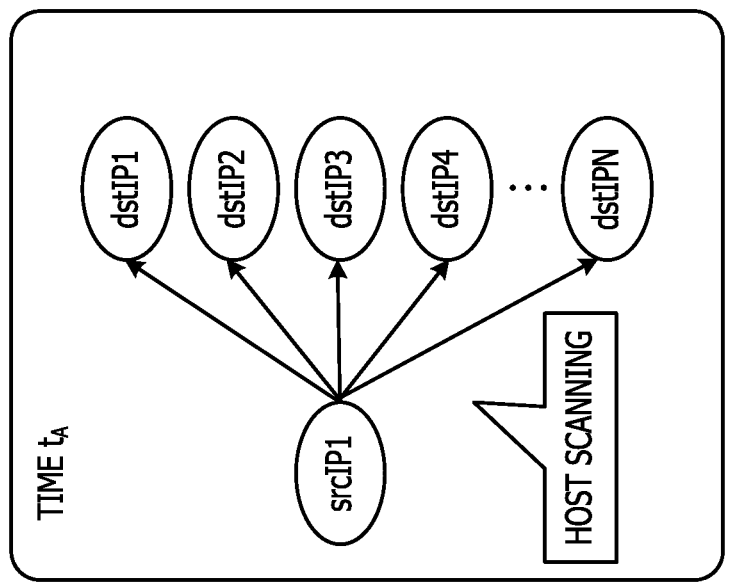

FIG. 14

| SUSPECT OF ATTACK SOURCE | HOST SCANNING PERFORMANCE TIME |
|---|---|
| 11.22.33.44 | 2012/3/31 23:00 |
| 55.66.77.88 | 2012/4/1 1:00 |
| ⋮ | ⋮ |

FIG. 16

| COMMUNICATION SOURCE | COMMUNICATION DESTINATION | TRANSFER TIME |
|---|---|---|
| 11.22.33.44 | 1.1.1.2 | 2014/4/1 0:00 |
| 11.22.33.44 | 1.1.1.2 | 2014/4/1 0:01 |
| 11.22.33.44 | 1.1.1.3 | 2014/4/1 0:02 |
| 11.22.33.44 | 1.1.1.3 | 2014/4/1 0:03 |
| 55.66.77.88 | 1.1.1.2 | 2014/4/1 6:00 |
| 55.66.77.88 | 1.1.1.2 | 2014/4/1 6:01 |
| ⋮ | ⋮ | ⋮ |

FIG. 18

| COMMUNICATION SOURCE | TIME OF LOG-IN AUTHENTICATION ATTEMPT |
|---|---|
| 11.22.33.44 | 2014/4/1 0:00 |
| 11.22.33.44 | 2014/4/1 0:02 |
| 55.66.77.88 | 2014/4/1 6:00 |
| ⋮ | ⋮ |

FIG. 20

| COMMUNICATION SOURCE | COMMUNICATION DESTINATION | TIME OF LOG-IN AUTHENTICATION ATTEMPT (ex. START TIME) | NUMBER OF ATTEMPTS OF LOG-IN AUTHENTICATION |
|---|---|---|---|
| 11.22.33.44 | 1.1.1.2 | 2012/4/1 0:00 | 10 |
| 11.22.33.44 | 1.1.1.3 | 2012/4/1 0:01 | 9 |
| 11.22.33.44 | 1.1.1.4 | 2012/4/1 0:00 | 10 |
| 55.66.77.88 | 1.1.1.4 | 2012/4/1 6:00 | 9 |
| ⋮ | ⋮ | ⋮ | ⋮ |

FIG. 23

| GROUP OF ATTACK TARGETS | BELONGING COMMUNICATION DESTINATION (CANDIDATES FOR ATTACK TARGET) |
|---|---|
| 1 | 1.1.1.2 |
| | 1.1.1.3 |
| | 1.1.1.4 |
| 2 | ... |
| | ... |

US 9,813,451 B2

APPARATUS AND METHOD FOR DETECTING CYBER ATTACKS FROM COMMUNICATION SOURCES

CROSS-REFERENCE TO RELATED APPLICATION

This application is based upon and claims the benefit of priority of the prior Japanese Patent Application No. 2014-168892, filed on Aug. 22, 2014, the entire contents of which are incorporated herein by reference.

FIELD

The embodiment discussed herein is related to an apparatus and a method.

BACKGROUND

There is known a security device called intrusion detection system (IDS) for monitoring cyber attacks. This intrusion detection system monitors communication with regard to a system and a network to be monitored and records communication logs.

In addition, such communication logs are analyzed, for example, to decide whether or not a communication source is an illegal access source based on, for example, the number of times for which the communication source attempts login authentication per unit time. Furthermore, if it is decided that the communication source is an illegal access source, such countermeasures as blocking the communication from the communication source for a certain period of time or the like is implemented.

There is known a technique in which a packet pattern that is a sign of an attack and received before a network attack is registered and in the case where the pattern is detected, a level to cope with the network attack associated with the pattern is raised.

In addition, a technique is known in which a TCP connection is detected and response time to the TCP connection is selectively delayed in order to slow down the process of the attack. The TCP connection is used by a packet that sends a request for communication start to a plurality of computers or a plurality of applications in the computers in order to find a computer in which the security level is low or to detect a flaw in the security of a computer. Japanese Laid-open Patent Publication No. 2010-250607 and Japanese Laid-open Patent Publication No. 2008-187701 are examples of the related art.

SUMMARY

According to an aspect of the invention, an apparatus includes a memory, and a processor coupled to the memory and configured to specify a communication source device that performs a plurality of traffic confirmations of communications with a plurality of first devices, and reject a plurality of first authentication requests for the plurality of first devices conducted by the communication source device after performing the plurality of traffic confirmations of communications.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates another characteristic of the second aspect of brute-force attacks obtained from the communication logs illustrated in FIG. 6;
FIG. 14 is a record example of a source of communication which is recorded by the access detection device of the embodiment and conducts host scanning;
FIG. 16 illustrates an example of a transfer history of the embodiment;
FIG. 18 illustrates an example of a dummy response history of the embodiment;
FIG. 20 illustrates an example of a history of log-in authentication attempts;
FIG. 23 illustrates examples of a group of attack targets and a candidate for an attack according to the embodiment.

DESCRIPTION OF EMBODIMENT

When a cyber attack may not be recognized and thus countermeasures thereto may not be taken, there is a concern that various pieces of information are extorted from a computer which is a target to be attacked.

By using the security system of this embodiment, it is possible to increase the extent of security with regard to cyber attacks.

Figure 1:
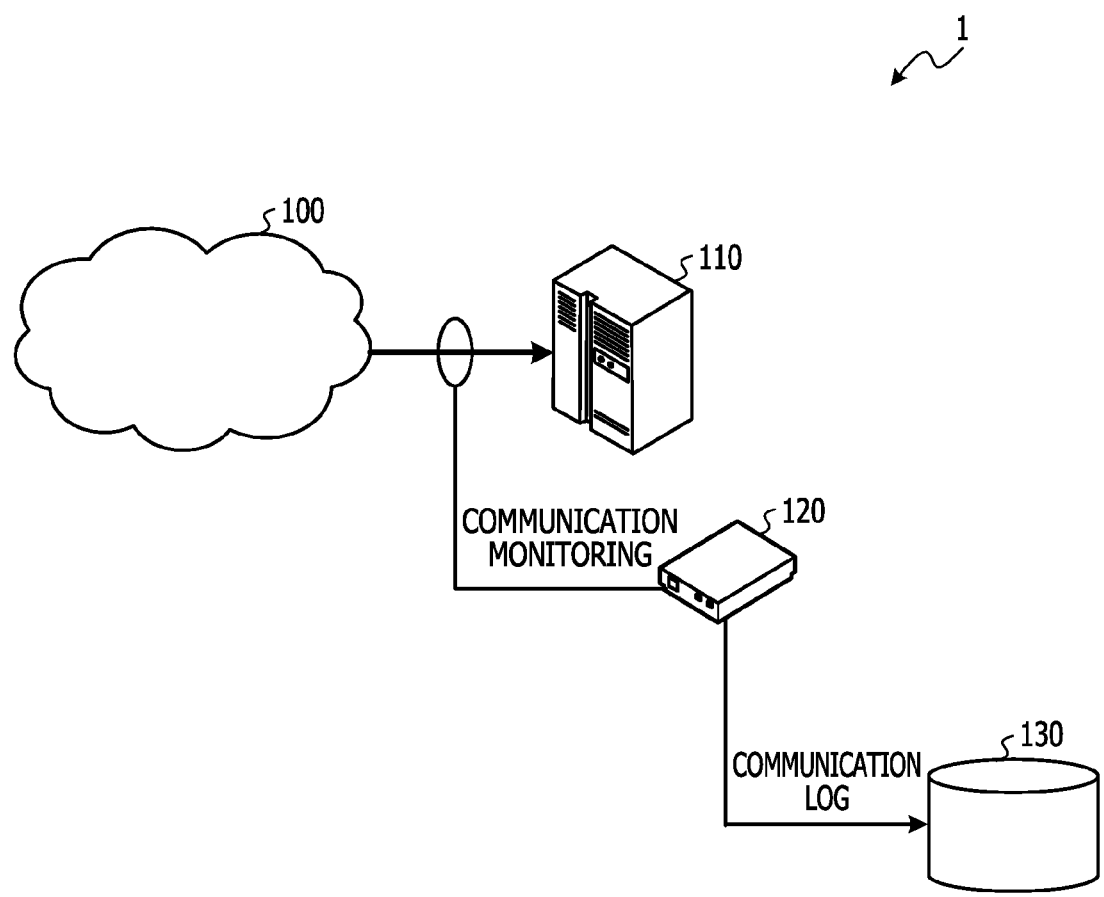
FIG. 1 illustrates an example of a security system.

FIG. 1 illustrates an example of a security system. An access monitoring system 1 monitors communication conducted through a network 100 toward a server device 110 and includes an access detection device 120 that detects communication that meets a certain rule. In addition, the access monitoring system 1 further includes a storage 130, in which a communication log that is detected by the access detection device 120 is recorded.

The access detection device 120, for example, is a security device generally called IDS, and has functions of mainly monitoring an access towards a computer having a certain IP address (for example, a server device or a communication device or the like), and of notifying the result of the monitoring. In addition, this intrusion detection system has a function of specifying an attack source IP address, and is able to conduct countermeasures such as cutting the communication from the specified attack source IP address.

As the access detection device 120, an intrusion prevention system (IPS) may be applied. An intrusion prevention system is a security device that performs not only intrusion detection but also automatic defense of a network by cutting communication interlocking with a firewall and the like.

Therefore, as one type of a cyber attack against the server device 110 illustrated in FIG. 1, a cyber attack which is launched through communication with the server device 110 extorts an ID and a password for logging in to the server device 110 may be exemplified.

In this cyber attack, a combination of an ID which is typically used as an ID such as "root" or "admin" and a password, a combination of an ID and a password which is considered to be leaked from a system, a combination of an ID and a password randomly selected, and the like are used to conduct a plurality of log-in authentication attempts. By attempting a plurality of log-in authentications, the combination of an ID and a password that passes the log-in authentication is found, thereby the ID and the password is extorted.

Here, in this specification, this kind of a cyber attack is called a brute-force attack. A brute-force attack includes, in a wide sense, an attack of attempting decoding of a cipher text by listing every known key, a dictionary attack of finding words collected in a dictionary as candidates to efficiently conduct the attack, and an attack of using a value initially set in a system.

Therefore, with regard to the brute-force attack, a certain rule is decided to detect communication in which the log-in authentication is attempted in the server device 110, and is set in the access detection device 120. In addition, in order to specify the communication source to which the log-in authentication is attempted, the access detection device 120 records a record of the log-in authentication attempts and an internet protocol address (hereinafter, an IP address) of the communication source as a communication log in the storage 130.

Meanwhile, when it is recognized that a plurality of log-in authentication attempts are made from a certain source of communication more than a certain threshold by this communication log, the communication source is determined as a source of a brute-force attack that attempts an illegal access to the communication source. Therefore, if a measure such as cutting communication from the communication source for a certain period of time is taken, it is possible to protect the server device 110 from the source of the brute-force attack.

Figure 2:
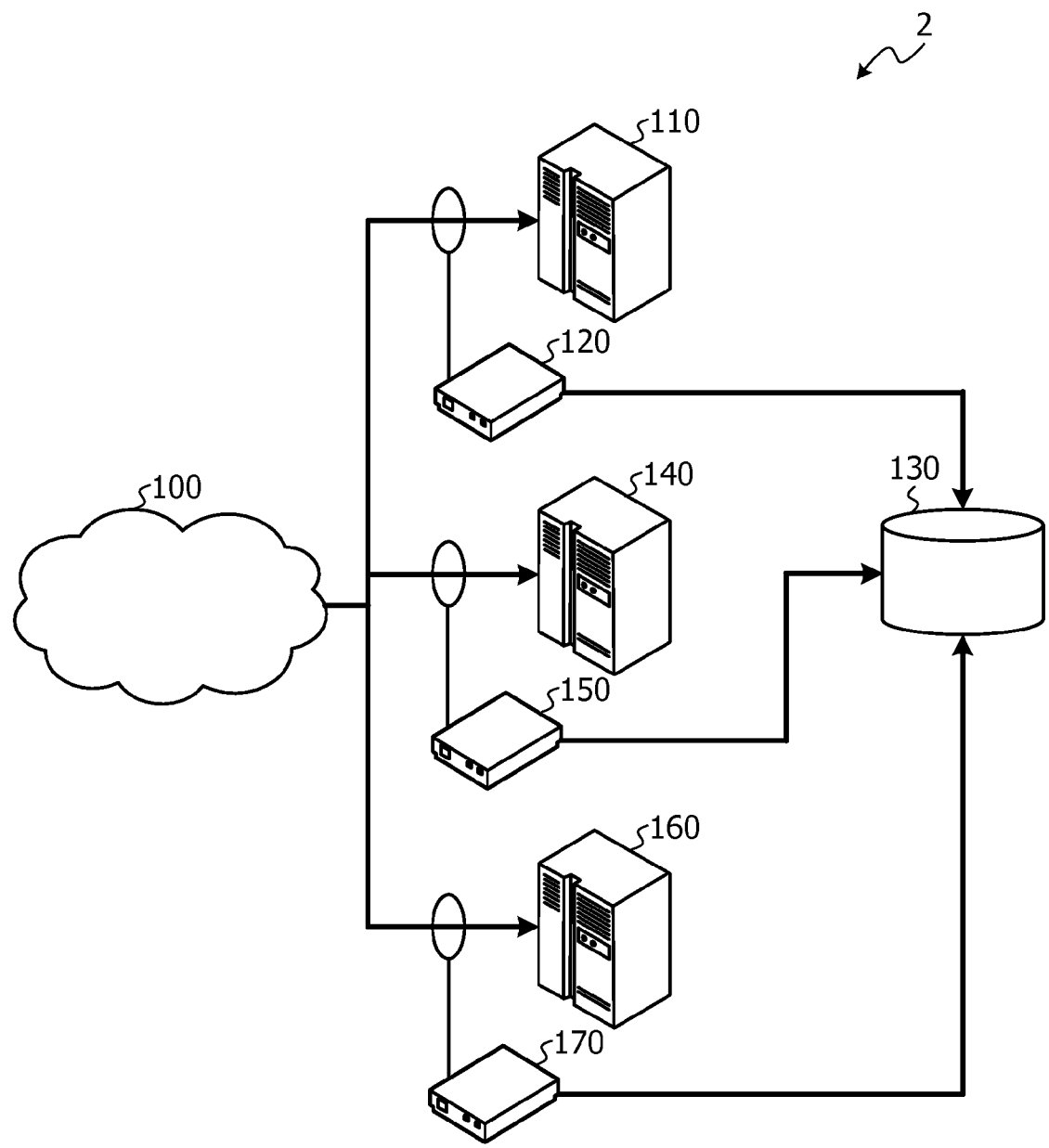
FIG. 2 illustrates another example of a security system.

FIG. 2 illustrates an example of a security system. An access monitoring system 2 monitors communication conducted through a network 100 toward a server device 110 and includes an access detection device 120 that detects communication that meets a certain rule. The access monitoring system 2 monitors communication conducted through the network 100 toward a server device 140 and includes an access detection device 150 that detects communication that meets a certain rule. The access monitoring system 2 monitors communication conducted through the network 100 toward a server device 160 and includes an access detection device 170 that detects communication that meets a certain rule. In addition, the access detection devices 150 and 170 have the same functions as the access detection device 120 described above in FIG. 1.

The access monitoring system 2 further includes a storage 130, in which a communication log that is detected by the access detection device 120, the access detection device 150, and the access detection device 170 is recorded. The access monitoring system 2 may monitor communication towards the server devices 110, 140, and 160 altogether with just one device such as the access detection device 120 or the like.

According to an analysis of the inventors, new knowledge has been discovered regarding the brute-force attack by monitoring the attempt for the log-in authentication with regard to a plurality of server devices at the same time by using a system such as the access monitoring system 2. To describe this knowledge, communication logs obtained by the inventors will be illustrated in FIGS. 3 and 4.

Figure 3:
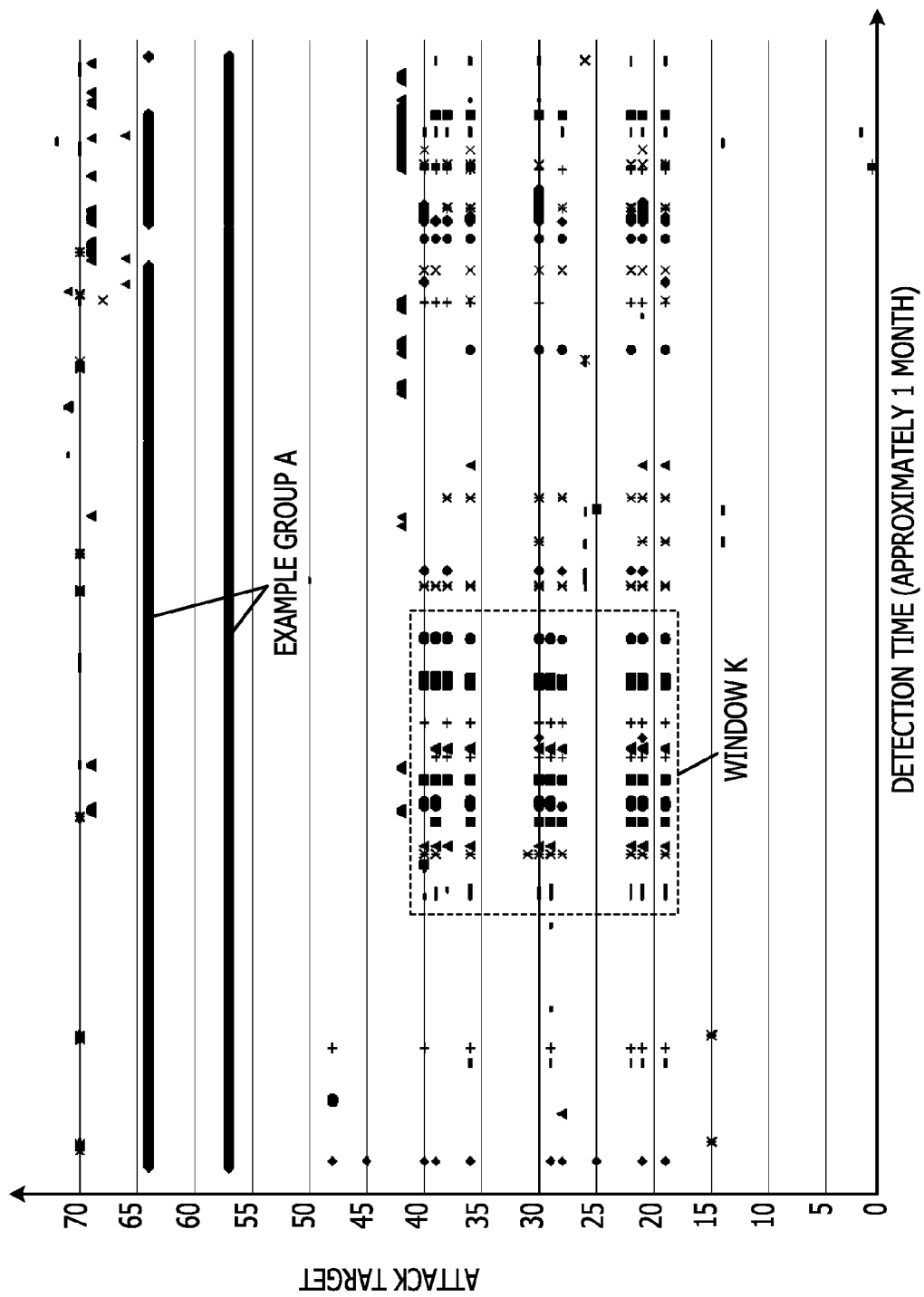
FIG. 3 illustrates an example of communication logs.

FIG. 3 illustrates an example of communication logs. In FIG. 3, communication logs obtained by the inventors by monitoring the attempts of the log-in authentication with regard to a plurality of server devices at the same time are illustrated. Here, on the horizontal axis, a detection time when the attempt of the log-in authentication is detected is illustrated. The monitoring period illustrated in FIG. 3 is approximately 1 month. In addition, on the vertical axis, numbers temporarily given to each device to distinguish between the devices which are targets of the attempt of the log-in authentication are illustrated. Devices to which the log-in authentication attempts are made are distinguished by each symbol in FIG. 3. In this specification, a device that makes the brute-force attack attempting the log-in authentication (for example, a server device, a communication device, and the like) and identification information for identifying the devices (for example, an IP address) are called an "attack source". A device that is subjected to the brute-force attack (for example, a server device, a communication device, and the like) and identification information for identifying the devices (for example, an IP address) are called an "attack target". In addition, "detection time" is a time when the brute-force attack is detected by the access detection devices 120, 150, and 170. Moreover, "the number of log-in authentication attempts" is, in a continuous period including a certain detection time, the number of detection of the attempts of the log-in authentication from the attack source to the target to be attacked. For example, if 5 minutes passes from a certain time and a certain target to be attacked is attacked from a certain attack source, the number of log-in authentication attempts is the total number of the attacks during the 5 minutes. The "number of log-in authentication attempts" also means the number of detections of the brute-force attack in a unit time. For example, the number of log-in authentication attempts may also mean the number of attempts of the log-in authentication during 1 minute. For example, if 5 minutes passes from a certain time and a certain target to be attacked is attacked from a certain attack source, the average of the number of attacks during 1 minute may be "the number of log-in authentication attempts". In addition, the "number of log-in authentication attempts" may also be called the "number of attacks".

First, a first aspect of the brute-force attack will be described focused on the attempt of log-in authentication illustrated as an example group A. In the attempt of log-in authentication illustrated as the example group A, a device identified as no. 57 and a device identified as no. 64 are attack targets, and the log-in authentication is attempted for a long period of time from the same attack source on the devices. This attack source changes an ID and a password randomly, and is considered to be trying to extort a proper combination forcibly. If the log-in authentication does not succeed but fails for a certain number of times, it is considered that every time the log-in authentication fails, the log-in authentication with the changed combination of an ID and a password is attempted.

In the case of the brute-force attack illustrated in the example group A, for example, detection may be conducted by applying a rule such as, when the number of failures of the log-in authentication from a certain communication source reaches a certain number or more, it is specified that the communication source is the attack source. In addition, it is possible to stop the brute-force attack from the communication source by cutting the communication from the communication source.

Figure 4:
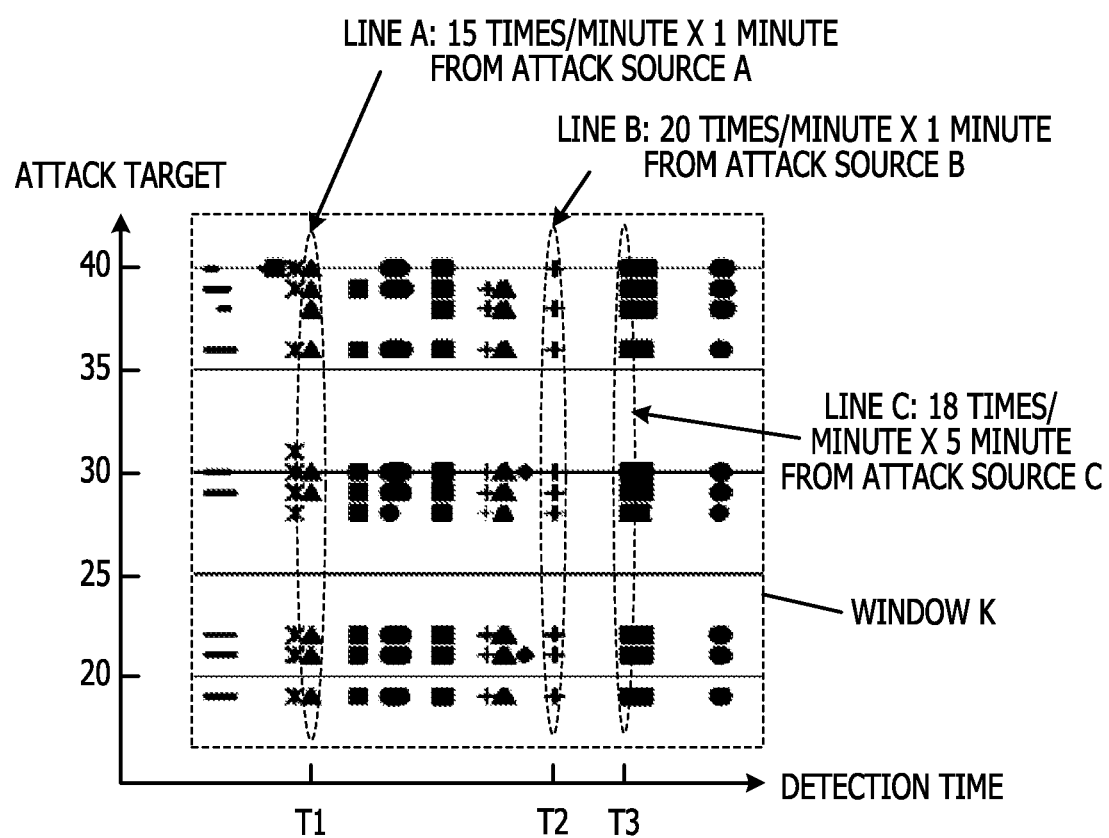
FIG. 4 is an enlarged view of a part of the communication logs illustrated in FIG. 3.

FIG. 4 is an enlarged view of a part of the communication logs illustrated in FIG. 3. First, a second aspect of the brute-force attack will be described focused on the communication in a window K illustrated in FIG. 3.

In FIG. 4, for 1 minute from time T1, an example is illustrated in which log-in authentication is attempted 15 times per minute on devices identified by device numbers of 18, 21, 22, 29, 30, 36, and 38 to 40 by an attack source A. In addition, for 1 minute from time T2, an example is illustrated in which log-in authentication is attempted 20 times per minute on devices identified by device numbers of 18, 21, 22, 28 to 30, 36, 38, and 40 by an attack source B. In addition, for 5 minutes from time T3, an example is illustrated in which log-in authentication is attempted 18 times per minute on devices identified by device numbers of 18, 21, 22, 28 to 30, 36, and 38 to 40 by an attack source C.

According to the analysis of the inventors, the brute-force attack illustrated in a window K has the following characteristics.

A first characteristic is that an attack source changes minute by minute. A second characteristic is that log-in authentication is attempted on a plurality of attack targets at approximately the same time for approximately the same number of times. A third characteristic is that the number of attempts of log-in authentication by an attack source is comparatively small.

To complement the first characteristic, device groups which are attack targets are approximately the same, and the IP address of an attack source changes. There is a possibility that an attacker might change. Preferably, however, it is assumed that the attacker attacks by changing an IP address of the attack source so that the attack source is not specified.

To complement the second characteristic, the attacks to a plurality of attack targets are detected at approximately the same time. In addition, by intermittent attacks with changing attack sources, the group of attack targets once targeted, become attack targets for a comparatively long period of time. Among the group of the attack targets are a target to be attacked that is newly added to the group of the attack targets by being attacked from the middle, and in contrast, a target to be attacked that is not to be attacked from the middle.

To complement the third characteristic, the number of attempts of log-in authentication by any one of an attack source is comparatively small. For example, regarding the number of attempts of log-in authentication on 1 target to be attacked, there is an analysis result that the average of the number in the entire communication logs illustrated in FIG. 3 is 72, while the average at a second aspect of the brute-force attack is 18. Thus, it is considered that, the number of failures of log-in authentications reaching a certain number or more suppresses the number of attacks of any one attack source in order to avoid the attack source being specified by an intrusion detection system or an intrusion prevention system.

As described above, the second aspect (window K) of the brute-force attack illustrated in FIGS. 3 and 4, is different from the first aspect of the brute-force attack (example group A), and may be called an insidious cyber attack in which the attack source is intermittently changed while the number of attacks during each unit time by each attack source is decreased so as to make it difficult for the cyber attack to be detected as a cyber attack by a security system.

Figure 5:
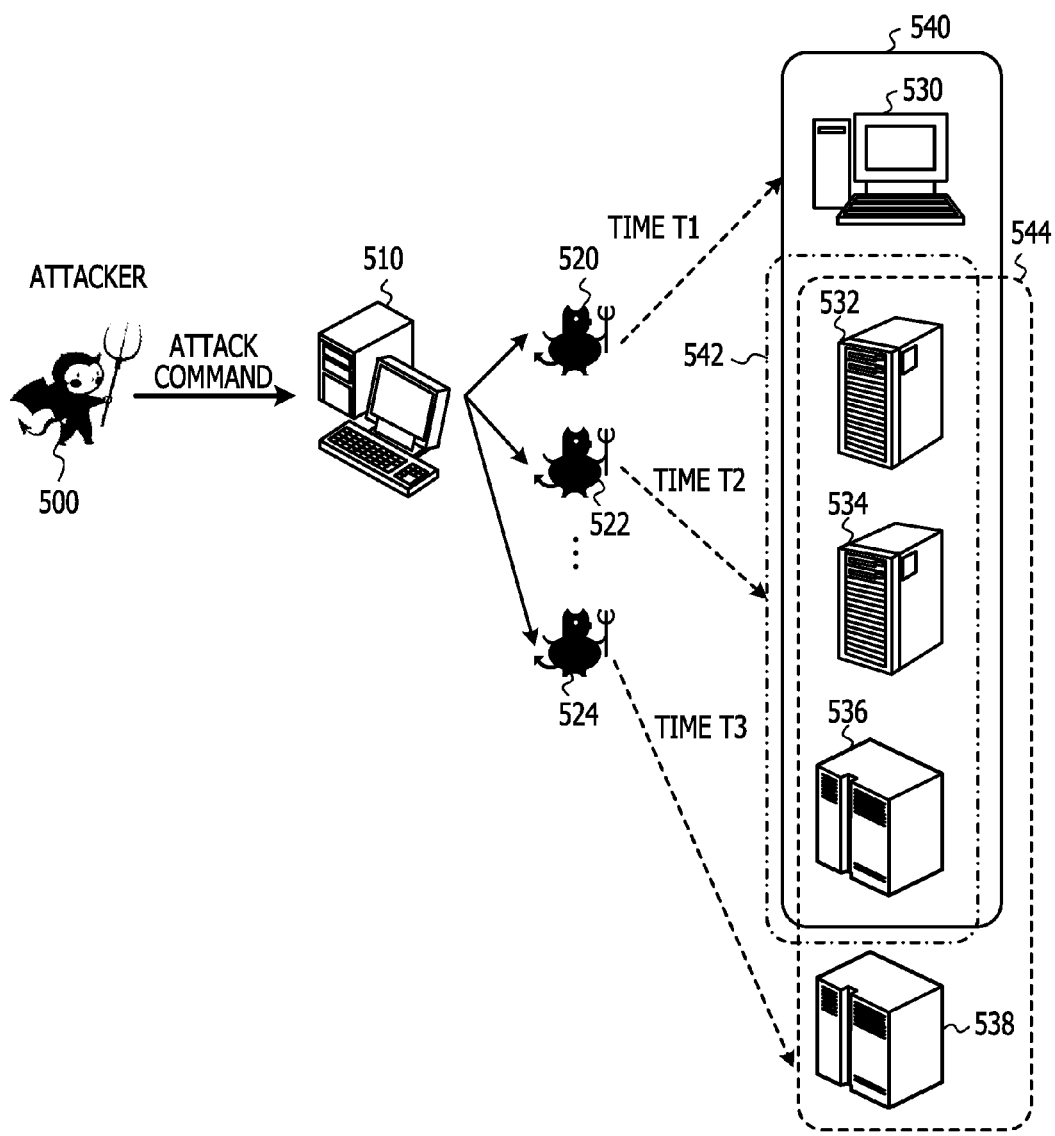
FIG. 5 illustrates a characteristic of a second aspect of brute-force attacks.

FIG. 5 illustrates a characteristic of a second aspect of brute-force attack. With regard to the second aspect of the brute-force attack illustrated in FIGS. 3 and 4, the characteristics discovered by the inventors are illustrated in FIG. 5.

An attacker 500 of the second aspect of the brute-force attack sets the brute-force attack by the attempt of log-in authentication in an attack device 510. For example, at the time T1, the attacker 500 sets an attack of attempting log-in authentication to attack targets 530, 532, 534, and 536 from an attack source 520 identified by a first IP address in the attack device 510 to perform the attack for a number of times to the extent that the attack is not detected by a monitoring system. In this case, the attack targets 530, 532, 534, and 536 are the group of attack targets 540. In addition, at the time T2 after the time T1, the attacker 500 sets an attack of attempting log-in authentication to attack targets 532, 534, and 536 from an attack source 522 identified by a second IP address in the attack device 510 to perform the attack for a number of times to the extent that the attack is not detected by a monitoring system. In this case, the attack targets 532, 534, and 536 are the group of attack targets 542. In addition, at the time T3 after the time T2, the attacker 500 sets an attack of attempting log-in authentication to attack targets 532, 534, 536, and 538 from an attack source 524 identified by a third IP address in the attack device 510 to perform the attack for a number of times to the extent that the attack is not detected by a monitoring system. In this case, the attack targets 532, 534, and 536 are the group of attack targets 542.

In this way, the attacker 500 of the second aspect of the brute-force attack is considered to not only set a plurality of computers as attack targets, but also search for as many computers as possible that may decrease the number of attacks using a certain IP address while extorting a combination of an ID and a password by changing an IP address of the attack source. In addition, it is considered that the number of failures of log-in authentication regarding a certain IP address is rendered to be a threshold or less that assumes whether an access is illegal or not (equal to security level or less) so as not to be specified as an attack source.

As illustrated in FIG. 5, when attacks at different times are compared, a correlation is recognized in which the group of attack targets is identical to a certain percentage according to the second characteristic. In other words, in the second aspect of the brute-force attack, there is a tendency that a target to be attacked which receives an attack once is attacked again. More specifically, it is discovered that a group of attack targets 540 attacked at the time T1, a group of attack targets 542 attacked at the time T2, and a group of attack targets 544 attacked at the time T3 are overlapped. According to communication logs obtained by the inventors, there is also a case in which all of the attack targets at different times are identical.

Moreover, according to the second characteristic, log-in authentication is attempted to the group of attack targets of the brute-force attack only at approximately the same time for approximately the same number of times. For this, specifying the attack source attempting the log-in authentication early and providing measures such as cutting communication from the attack source and the like by comprehending the tendency of the log-in authentication may be considered. However, to comprehend the tendency, for example, illegal log-in authentication may not but be received for the period during which the correlation between the attempts of log-in authentication on each computer are monitored.

Figure 6:
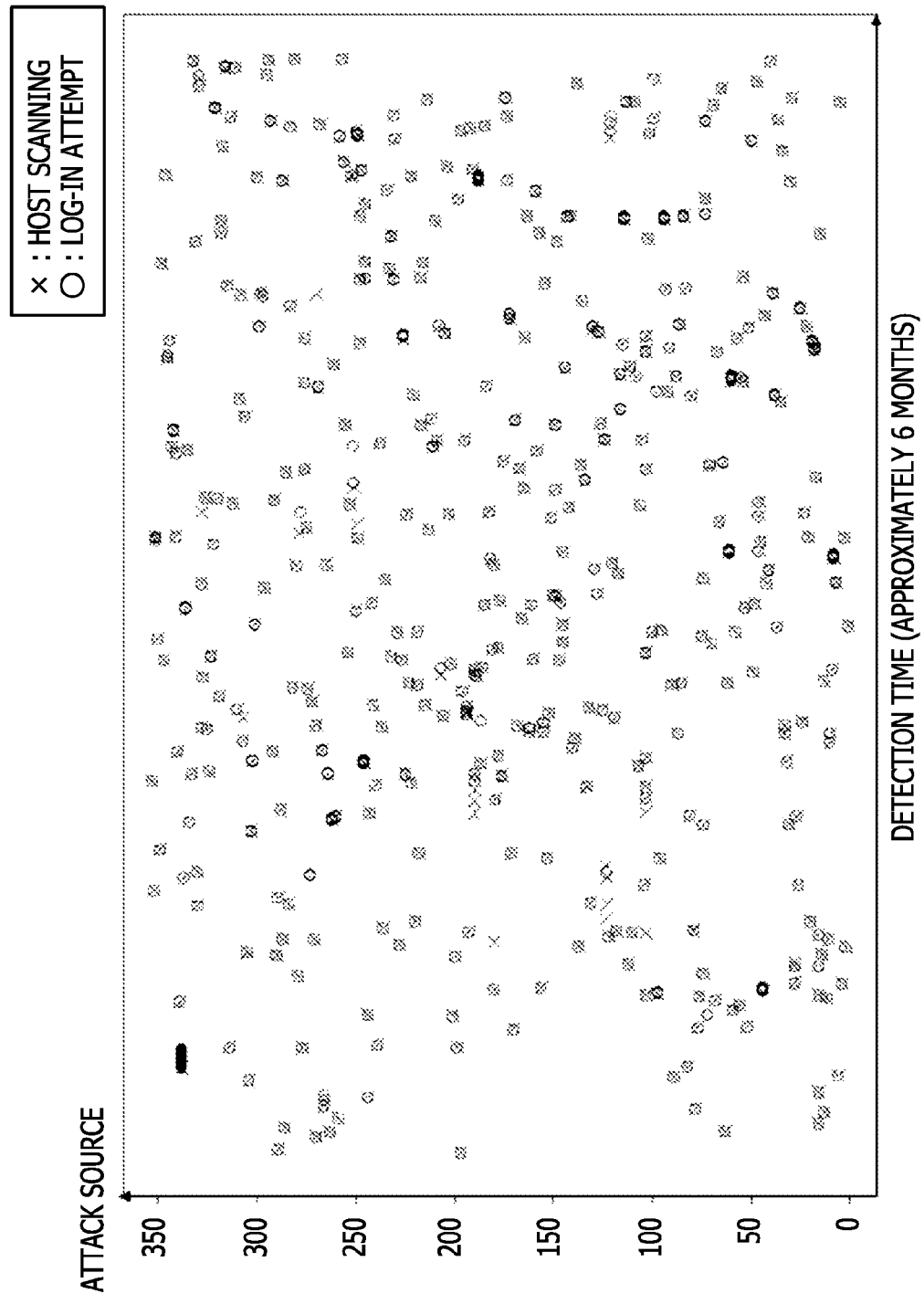
FIG. 6 illustrates another example of communication logs related to the second aspect of brute-force attacks.

FIG. 6 illustrates an example of communication logs related to the second aspect of brute-force attack. In FIG. 6, on the horizontal axis, detection time when host scanning and the attempt of the log-in authentication are detected is illustrated. The monitoring period illustrated in FIG. 6 is approximately 6 months. In addition, on the vertical axis, numbers temporarily given to each device to distinguish the devices which are attack sources which make the log-in authentication attempts are illustrated. Then, the host scanning is illustrated by a sign X, and an attempt of log-in authentication is illustrated by a sign O. The communication logs illustrated in FIG. 6 are communication logs obtained by the inventors. In the communication logs, there is another major characteristic at the second aspect of the brute-force attack.

The characteristic is that host scanning illustrated by the sign X is performed before the attempt of log-in authentication illustrated by the sign O. In addition, according to the analysis of the inventors, it is found that the first attempt of log-in authentication is started 3 to 10 minutes after the performance of the host scanning.

The host scanning is a traffic confirmation of communication while changing an IP address of a communication destination in order to search a computer capable of communication. However, the embodiments are not limited to this. For example, the host scanning includes searching for a computer capable of communication with regard to a port number that determines certain service, and, more specifically, searching for a computer in which an inquiry by commands such as a ping for confirming communication traffic is performed to a plurality of computers and the traffic confirmation of communication is performed according to whether the response to the inquiry is positive while changing an IP address by incrementing the IP address or the like.

In addition, for commands such as a ping which is a command used only for traffic confirmation of communication, a computer does not desire authentication if only such a command is performed. Moreover, in the case of a server device of which an access is generally opened or a server device of which some services are provided, performance of a command by a user is generally permitted since the communication with an outside user is assumed. The attacker of the brute-force attack abuses the command as a preparatory phase of an attack to extort an ID and a password and first searches a computer in which communication with an outside user is permitted among a plurality of computers.

In the security device such as the intrusion detection system or the intrusion prevention system, statistically valid conditions are set for determining whether an action is the host scanning, such as commands including a ping performed for certain times or more during a certain period from a certain communication source or an IP address of a communication destination specified at the time of the performance being changed. In addition, by determining whether the use of commands that satisfy these conditions is confirmed, it is determined whether the host scanning is performed. Moreover, the communication source in which it is decided that the host scanning is performed is presumed as a malicious source of a communication or measures such as cutting communication with the communication source for a certain period of time are taken.

In FIG. 7, other characteristics of the second aspect of the brute-force attack obtained from the communication logs illustrated in FIG. 6 are illustrated. In the second aspect of the brute-force attack, in order to try log-in authentication to a plurality of attack targets, the attacker first searches for a plurality of computers capable of communication by using the host scanning as a preparatory phase of an attack. In addition, in this specification, an IP address for identifying a communication source which is an attack source and such a communication source are marked as srcIP (source IP), and an IP address for identifying a communication destination which is a target to be attacked and such a communication destination is marked as dstIP (destination IP).

As illustrated in FIG. 7, the attacker performs the host scanning to a plurality of communication destinations identified as dstIP1-N from a source of communication identified as an IP address of srcIP1. In addition, at time $t_B$ thereafter, the attacker attempts log-in authentication to extort a combination of an ID and a password with regard to the part or entirety of a plurality of devices capable of confirming communication traffic. Moreover, as described above, regarding a plurality of computers that once extorts the traffic confirmation of communication, the second aspect of the brute-force attack has a characteristic that, even after the IP address of a source of communication is changed from srcIP1 to other IP addresses, log-in authentication is attempted to the part or the entirety thereof. In addition, for example, it is also assumed that an attack is repeated by the attacker to the target to be attacked from which once the traffic confirmation of communication was extorted without performing the host scanning in the second attack.

According to the exemplary embodiment described later, if log-in authentication is attempted after the traffic confirmation of communication, the failure of logging-in is recovered by presuming that the attempt of the log-in authentication is malicious. In addition, during the recovery of the failure of the logging-in, a plurality of groups of devices which are targets of the attempt of the log-in authentication is recorded as a group of devices if the communication source presumed to be malicious has an interest therein. Thus, it is possible to stop cyber attacks in an early stage while specifying a target to be attacked.

In addition, when recording the IP address of the source of communication which attempts the log-in authentication as the IP address of an uncertain source of a communication, the IP address is used as information for specifying which one of a plurality of attempts of log-in authentication is the attempt of log-in authentication by the communication source. Then, in the case where it is determined whether the communication source is malicious by confirming a certain correlation between a plurality of attempts of log-in authentication by the communication source, by using the characteristic that the attack source is made to be incapable of attacking after a certain period of time passes, and by counterplotting the characteristic that the attacker repeats attacks intermittently while changing the IP address of the attack source, the recorded IP address is removed from a database after the certain period of time passes. Thus, it is possible to effectively control the amount of use of the database and the characteristics of attacks. As illustrated in FIG. 6, in the brute-force attack, effective use of the database leads to a significant effect since the record of the IP address of the source of the uncertain communication presumed to be malicious has a tendency of increasing in a rapid manner.

With regard to the multiplicity of groups of devices recorded during the period when logging-in is repeatedly failed, the record is used as candidates of the target to be attacked that is likely to attempt log-in authentication thereafter by other IP addresses of a source of communication. In other words, in the embodiment, during the period when the first attack is stopped and the damage thereof is avoided by recovering the logging-in failure with regard to the communication source specified by using the traffic confirmation of communication as an opportunity, the information to be used for countermeasures towards attacks in the case where the IP address of the communication source is changed is obtained.

By obtaining the information in an early stage, in a case where log-in authentication is attempted from other sources of communication which do not perform the host scanning, if it is confirmed that the multiplicity of devices which are made to be candidates (the group of attack targets and the candidates for attack targets which are listed in the past) and the demanded destination of the log-in authentication (the present group of attack targets) are identical in a certain percentage or more, it is determined that the attacker uses other IP addresses of communication to attack again, and countermeasures thereto are taken. In other words, in the embodiment, for example, even if the attacker attempts to attack again by changing an IP address of communication source, it is possible to correspond thereto by specifying the illegal attempt of log-in authentication based on the group of attack targets that is listed.

Since the traffic confirmation of communication is a preparatory phase of an attack, and it may not be said that damages are generated by only performing the traffic confirmation, 1 IP address used by the attacker is obtained with the traffic confirmation used as an opportunity. In addition, in order not to generate damages with regard to the attempt of log-in authentication after the performance of the traffic confirmation of communication, the log-in authentication is first not permitted for every request, and it is noticed that the log-in authentication failed. The attacker that uses the second aspect of the brute-force attack attempts to forcibly attack by using all combinations. Therefore, the attacker does not care even when receiving the notice that the log-in identification failed, changes the IP address of the communication source, and only attempts the next log-in authentication after a certain period of time.

In the embodiment, with regard to the request for logging-in from the communication source that performs the host scanning, the access prevention device repeats log-in failure. A certain rule is set in the access detection device for detecting the host scanning; therefore the communication source that performed the host scanning is presumed to be a suspect of an attack source. In other words, since the access detection device presumes the communication source as the suspect of an attack source based on the certain rule that is set and then the access prevention device recovers the log-in failure, the process is performed so that the process of the access prevention device does not contradict the detection result of the access detection device.

Figure 8:
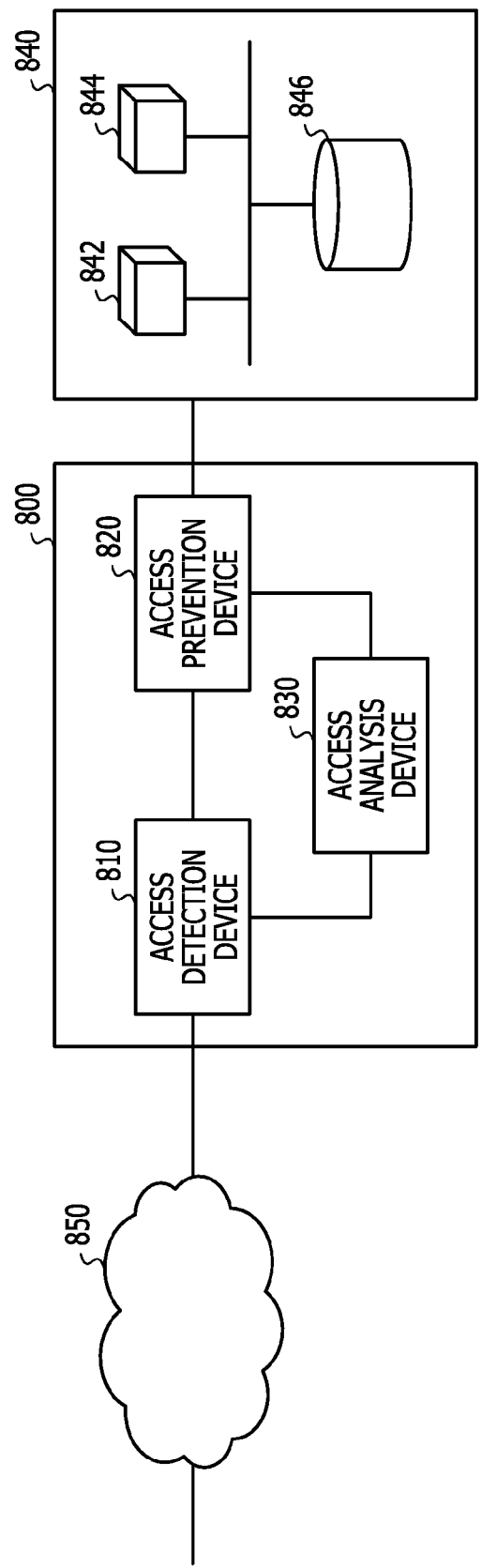
FIG. 8 illustrates an example of a security system of an embodiment.

FIG. 8 illustrates an example of a security system. A security system 800 illustrated in FIG. 8 includes an access detection device 810, an access prevention device 820, and an access analysis device 830. The access detection device 810 is coupled between a system 840 and a network 850. The access detection device 810 is, as described below in detail, a security device that detects communication from the network 850 with regard to server devices 842 and 844, a storage 846, and the like which are included in the system 840. In addition, the system 840 is a system in which the server devices 842 and 844, the storage 846, and the like are coupled with each other by a certain network, and sometimes is a system in which the server devices 842 and 844, the storage 846, and the like are coupled with each other by a local area network, a data center, or the like. Moreover, devices included in the system 840 illustrated in FIG. 8 are examples, and it is stated here that the quantity or the like of the server devices 842 and 844 and the storage 846 is not limited to the embodiment.

The access prevention device 820 is coupled between the system 840 and the access detection device 810. The access prevention device 820 is, as described below in detail, a security device for taking countermeasures with regard to communication detected by the access detection device 810.

The access analysis device 830 is coupled between the access detection device 810 and the access prevention device 820. The access analysis device 830 is, as described below in detail, a security device that analyzes communication detected by the access detection device 810.

Figure 9:
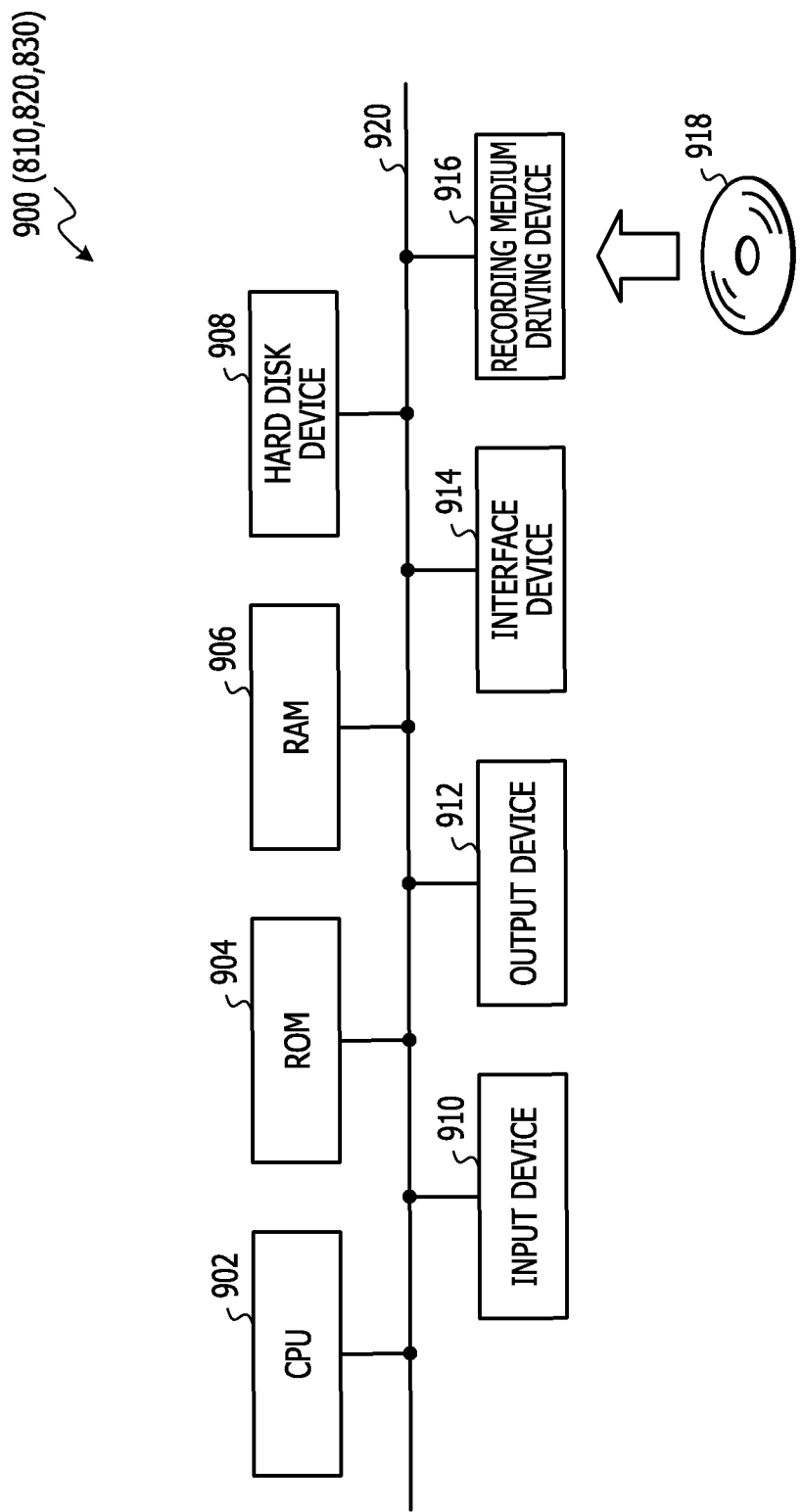
FIG. 9 illustrates a hardware configuration of an access detection device, an access analysis device, and an access prevention device of the embodiment.

FIG. 9 illustrates a hardware configuration of an access detection device, an access analysis device, and an access prevention device of the embodiment. The access detection device 810, the access prevention device 820, and the access analysis device 830 illustrated in FIG. 8 have a configuration of a general computer 900 illustrated in FIG. 9. In addition, in order to simplify the description in the embodiment, the same signs are also used in description of the constituent elements of the computer (for example, CPU 902, or the like) contained in each of the access detection device 810, the access prevention device 820, and the access analysis device 830.

The computer 900 includes a central processing unit (CPU) 902, a read only memory (ROM) 904, and a random access memory (RAM) 906. The computer 900 further includes a hard disk device 908, an input device 910, an output device 912, an interface device 914, and a recording medium driving device 916. In addition, the constituent elements thereof are coupled with each other through a bus 920 and receive various data under the management of the CPU 902.

The CPU 902 is a computation processing device that controls the entire operation of the computer 900 and functions as a control processing unit of the computer 900.

The ROM 904 is a semi-conductor memory exclusive for reading in which a certain basic control program is recorded in advance. The CPU 902 is able to control the operation of each constituent elements of the computer 900 by reading and executing the basic control program when the computer 900 is started.

The RAM 906 is a semi-conductor memory capable of writing and reading at any time which is used by the CPU 902 as an operation storage area if desired when executing various control programs.

In the case of the access detection device 810, the program for performing a process illustrated in FIGS. 13 and 15 described below is read by the RAM 906, and the access detection device 810 performs the function illustrated in FIG. 10 by the CPU 902 executing the program.

In the case of the access prevention device 820, the program for performing a process illustrated in FIG. 17 described below is read by the RAM 906, and the access prevention device 820 performs the function illustrated in FIG. 11 by the CPU 902 executing the program.

In the case of the access analysis device 830, the program for executing a process illustrated in FIGS. 19, 21, and 23 described below is read by the RAM 906, and the access analysis device 830 performs the function illustrated in FIG. 12 by the CPU 902 executing the program.

The hard disk device 908 is a storage device that stores various control programs and data executed by the CPU 902. The CPU 902 reads and executes a certain control program stored in the hard disk device 908 to conduct various controlling processes described below.

The input device 910 is, for example, a mouse or a keyboard. When the input device 910 is operated by a user of the computer 900, the input device obtains input of various pieces of information corresponding to the content of the operation, and sends the obtained input information to the CPU 902.

The output device 912 is, for example, a liquid crystal display, and displays various texts or images corresponding to the display data sent from the CPU 902.

The interface device 914 performs management of transfer of various pieces of information between various devices coupled with the computer 900. The interface device 914 is, for example, a network interface card (NIC).

The recording medium driving device 916 is a device that performs reading of various control programs and data recorded in a portable recording medium 918. The CPU 902 reads and performs a certain control program recorded in the portable recording medium 918 through the recording medium driving device 916, thereby performing various control processes described below. In addition, the portable recording medium 918 includes, for example, a flash memory provided with a connector with a standard of Universal Serial Bus (USB), compact disc read only memory (CD-ROM), digital versatile disc read only memory (DVD-ROM), and the like.

Figure 10:
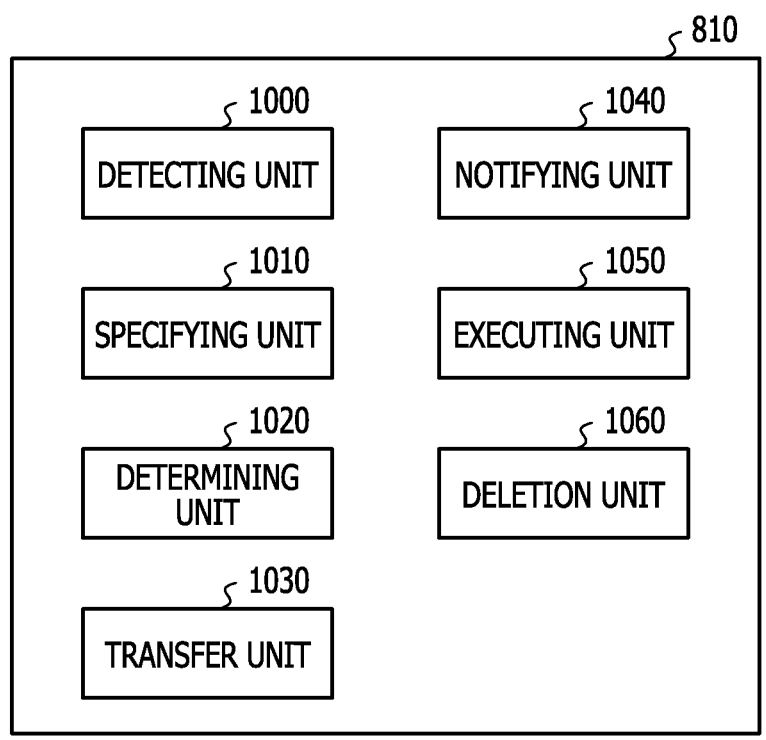
FIG. 10 illustrates functional blocks of the access detection device of the embodiment.

FIG. 10 illustrates a functional block of the access detection device of the embodiment. An access detection device 810 illustrated in FIG. 8, for example, functions as a detecting unit 1000, a specifying unit 1010, a determining unit 1020, a transfer unit 1030, a notifying unit 1040, a executing unit 1050, and a deletion unit 1060 whereas a program which is used as a working memory and loaded to the RAM 906 of the access detection device 810 is executed by the CPU 902 of the access detection device 810. In addition, the process performed by these functional units is described below in FIGS. 13 and 15.

Figure 11:
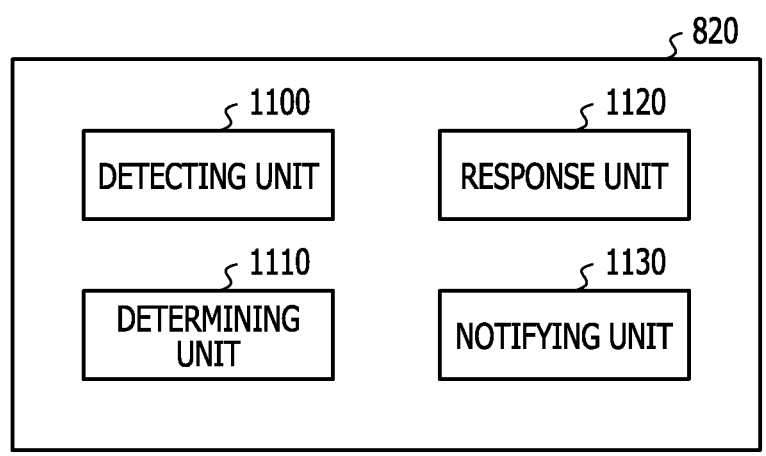
FIG. 11 illustrates functional blocks of the access prevention device of the embodiment.

FIG. 11 illustrates a functional block of the access prevention device of the embodiment. An access prevention device 820 illustrated in FIG. 8, for example, functions as a detecting unit 1100, a determining unit 1110, a response unit 1120, and a notifying unit 1130 whereas a program which is used as a working memory and loaded to the RAM 906 of the access prevention device 820 is executed by the CPU 902 of the access prevention device 820. In addition, the process performed by these functional units is described below in FIG. 17.

Figure 12:
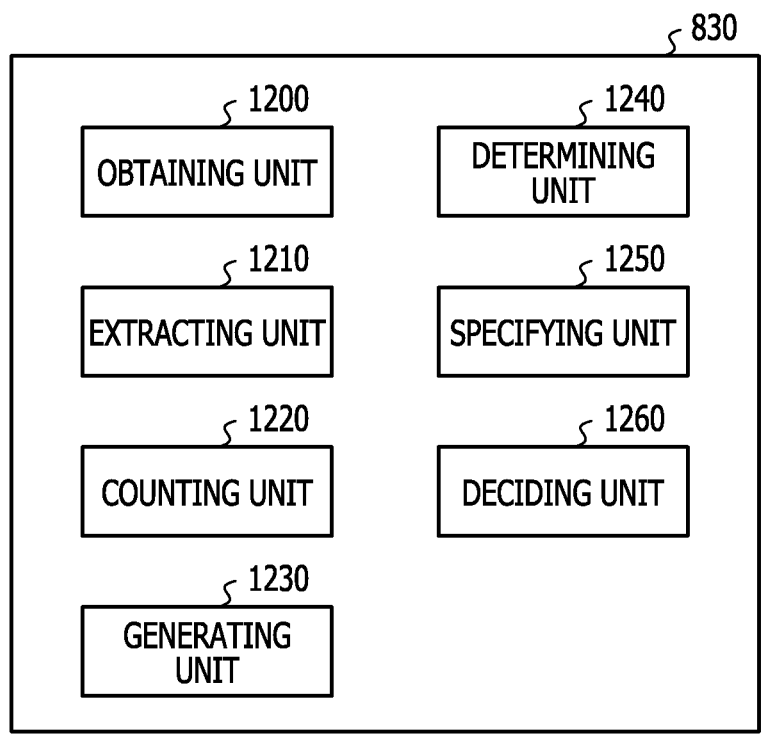
FIG. 12 illustrates functional blocks of the access analysis device of the embodiment.

FIG. 12 illustrates a functional block of the access analysis device of the embodiment. An access analysis device 830 illustrated in FIG. 8, for example, functions as an obtaining unit 1200, an extracting unit 1210, a counting unit 1220, a generating unit 1230, a determining unit 1240, a specifying unit 1250, and a deciding unit 1260 whereas a program which is used as a working memory and loaded to the RAM 906 of the access analysis device 830 is performed by the CPU 902 of the access analysis device 830. In addition, the process performed by these functional units is described below in FIGS. 19, 21 and 23.

How to assign the functioning units included in the access detection device 810, the functioning units included in the access analysis device 830, and the functioning units included in the access prevention device 820 to each of devices is not limited to the assigning method described above. For example, the part or entirety of the functioning units included in the access detection device 810 and the access prevention device 820 may be appropriately installed in the access analysis device 830, or the part or entirety of the functioning units included in the access detection device 810 and the access analysis device 830 may be appropriately installed in the access prevention device 820, or the part or entirety of the functioning unit included in the access prevention device 820 and the access analysis device 830 may be appropriately installed in the access detection device 810.

Figure 13:
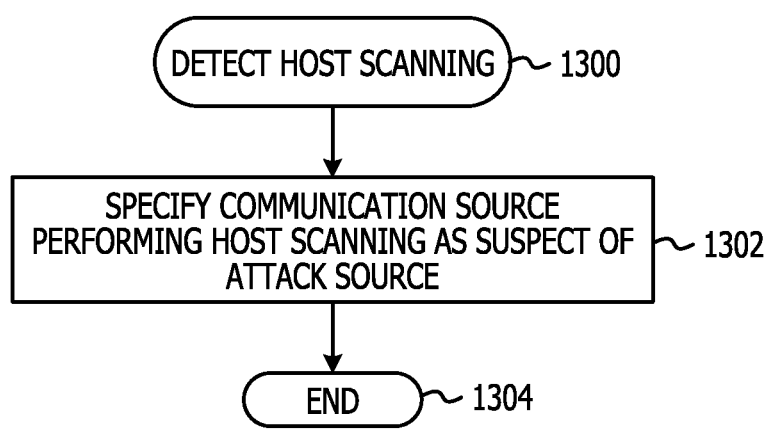
FIG. 13 illustrates a process conducted by the access detection device of the embodiment.

FIG. 13 illustrates a process performed by the access detection device of the embodiment. A process illustrated in FIG. 13 is a process performed by the access detection device 810 illustrated in FIG. 8, and a process for recording a communication source as a suspect of an attack source since there is a possibility that the source of communication which performed the host scanning may attempt illegal log-in authentication.

By a process 1300, the detecting unit 1000 illustrated in FIG. 10 detects the above-described host scanning, and thereby the process illustrated in FIG. 13 is started. In addition, with regard to a process 1300, the detecting unit 1000 monitors communication towards the system 840 and detects communication that performs traffic confirmation of communication while changing an IP address of a communication destination to search for a device capable of communication, thereby detecting the above-described host scanning. More specifically, the detecting unit 1000 changes the communication destination by incrementing the IP address of the communication destination specified by a certain port number while detecting communication that is combined by commands such as a ping to confirm the traffic of the communication, thereby detecting the above-described host scanning.

After the process 1300, a process 1302 that specifies a source of communication that performs the host scanning as a suspect of an attack source is performed by the specifying unit 1010. The process 1302 specifies a source of communication that performs the host scanning as a suspect of an attack source and, to record the operation, obtains an IP address of the communication source illustrated in the host scanning detected by the process 1300, and records the IP address of the communication source after relating the IP address of the communication at the time when the host scanning is detected in a storage device in the access detection device 810. Information recorded by the process 1302 is illustrated in FIG. 14.

In addition, the communication source specified by the process 1302 is a candidate for an illegal access source which has a possibility of attempting an illegal access. For this, in the embodiment, the communication source is called a suspect of an attack source, and the IP address of the source of communication is called the IP address of the suspect of an attack source.

After the process 1302, a process illustrated in FIG. 13 is terminated by a process 1304.

FIG. 14 is a record example of a source of communication which is recorded by the access detection device of the embodiment and conducts host scanning. In FIG. 14, an IP address of a suspect of an attack source recorded by a storage device of the access detection device 810 by the process 1302 illustrated in FIG. 13 is illustrated. Here, a case is illustrated in which host scanning performed by a source of communication identified as an IP address of "11. 22. 33. 44" is detected by the process 1300 at "2012/3/31 23:00", and is recorded in a storage device of the access detection device 810 by the process 1302.

Figure 15:
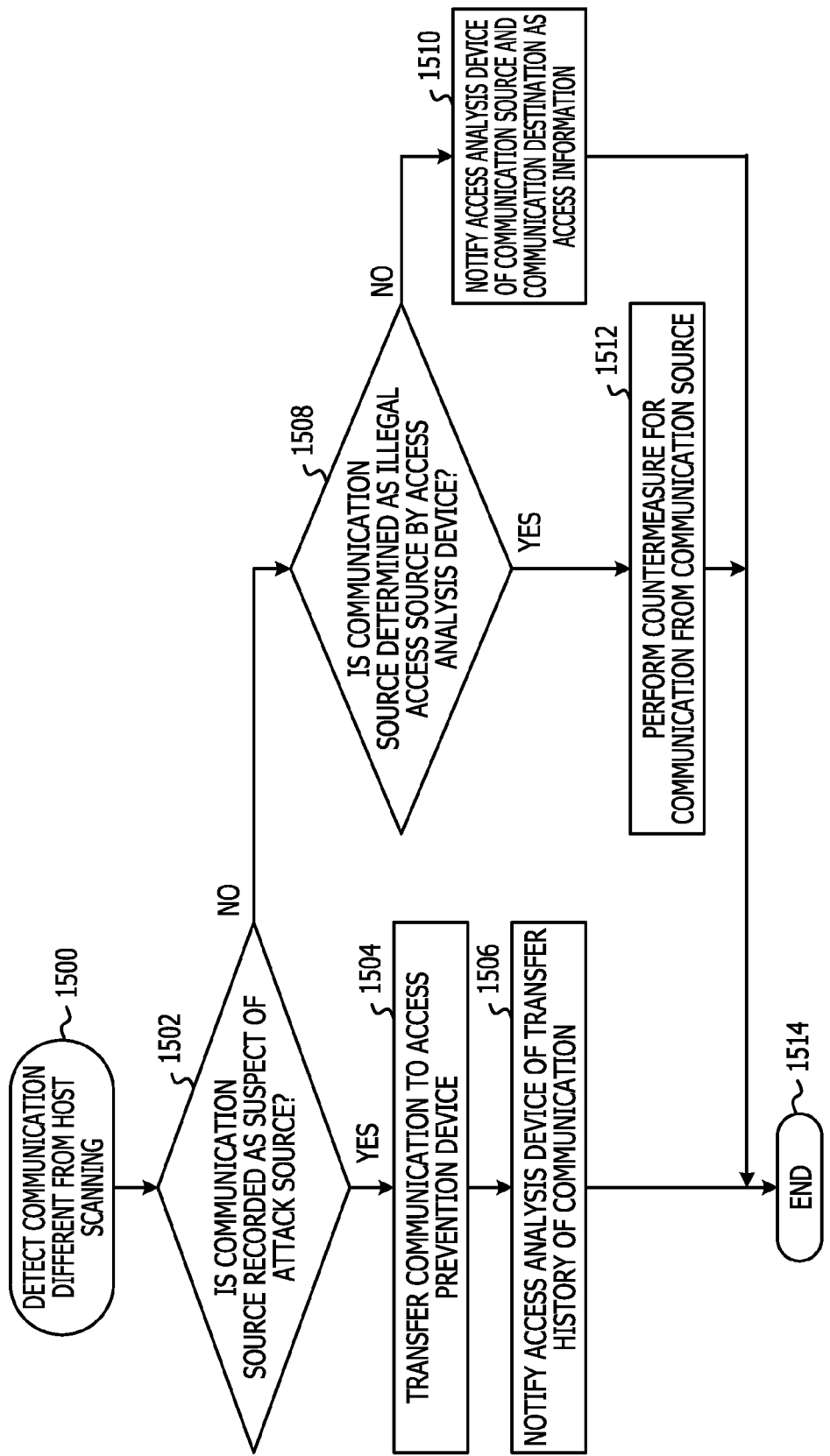
FIG. 15 illustrates another process conducted by the access detection device of the embodiment.

FIG. 15 illustrates another process conducted by the access detection device of the embodiment. A process illustrated in FIG. 15 is another process performed by the access detection device 810 illustrated in FIG. 8. By a process 1500, the detecting unit 1000 illustrated in FIG. 10 detects communication different from the host scanning, and thereby the process illustrated in FIG. 15 is started. In addition, communication different from the host scanning is, for example, communication for attempting log-in authentication, and the like.

After the process 1500, a process 1502 that determines whether the source of communication detected by the process 1500 is recorded is performed by the determining unit 1020. In the process 1502, it is determined whether the IP address of the source communication detected in the process 1500 corresponds to one of the IP addresses of the communication source recorded by the process 1302, and thereby whether the suspect of the attack source is recorded is determined. By the process 1502, it is determined whether the communication source recorded as a suspect of an attack source by the process 1302 is different from the host scanning, which, for example, becomes an opportunity to detect the attempt of log-in authentication by the communication source. According to the result of the process 1502, in a case where it is determined to record the communication source as a suspect of an attack source, the procedure moves to a process 1504, and in a case where it is not determined to record the communication source as a suspect of an attack source, the procedure moves to a process 1508.

In a case where it is determined to record the communication source in the process 1502, the process 1504 that transfers the communication to the access prevention device 820 is performed by the transfer unit 1030. By the process 1504, communication detected by the process 1500 is transferred to the access prevention device 820.

A process 1506 that notifies the access analysis device 830 of a transfer history of the communication is performed by the notifying unit 1040. In the process 1506, an IP address of the communication source, an IP address of the communication destination, and the transfer time of the communication transferred to the access prevention device 820 are recorded in relation to one another, and these pieces of information are sent to the access analysis device 830. In addition, an example of the transfer history is illustrated in FIG. 16.

After the process 1506, a process illustrated in FIG. 15 is terminated by a process 1514. In addition, among the processes illustrated in FIG. 15, processes 1508, 1510, and 1512 will be described below.

FIG. 16 illustrates an example of a transfer history of the embodiment. The transfer history illustrated in FIG. 16 is an example of information sent from the access detection device 810 to the access analysis device 830 by the process 1506 illustrated in FIG. 15. In addition, with regard to the transfer history, an IP address of the communication source, an IP address of the communication destination, and the transfer time of the communication transferred to the access prevention device 820 are recorded in relation to one another. In FIG. 16, a fact that communication conducted with regard to a communication destination identified by an IP address of "1. 1. 1. 2" by the communication source identified by an IP address of "11. 22. 33. 44" is transferred from the access detection device 810 to the access prevention device 820 at "2014/4/1 0:00" is recorded as a transfer history.

Figure 17:
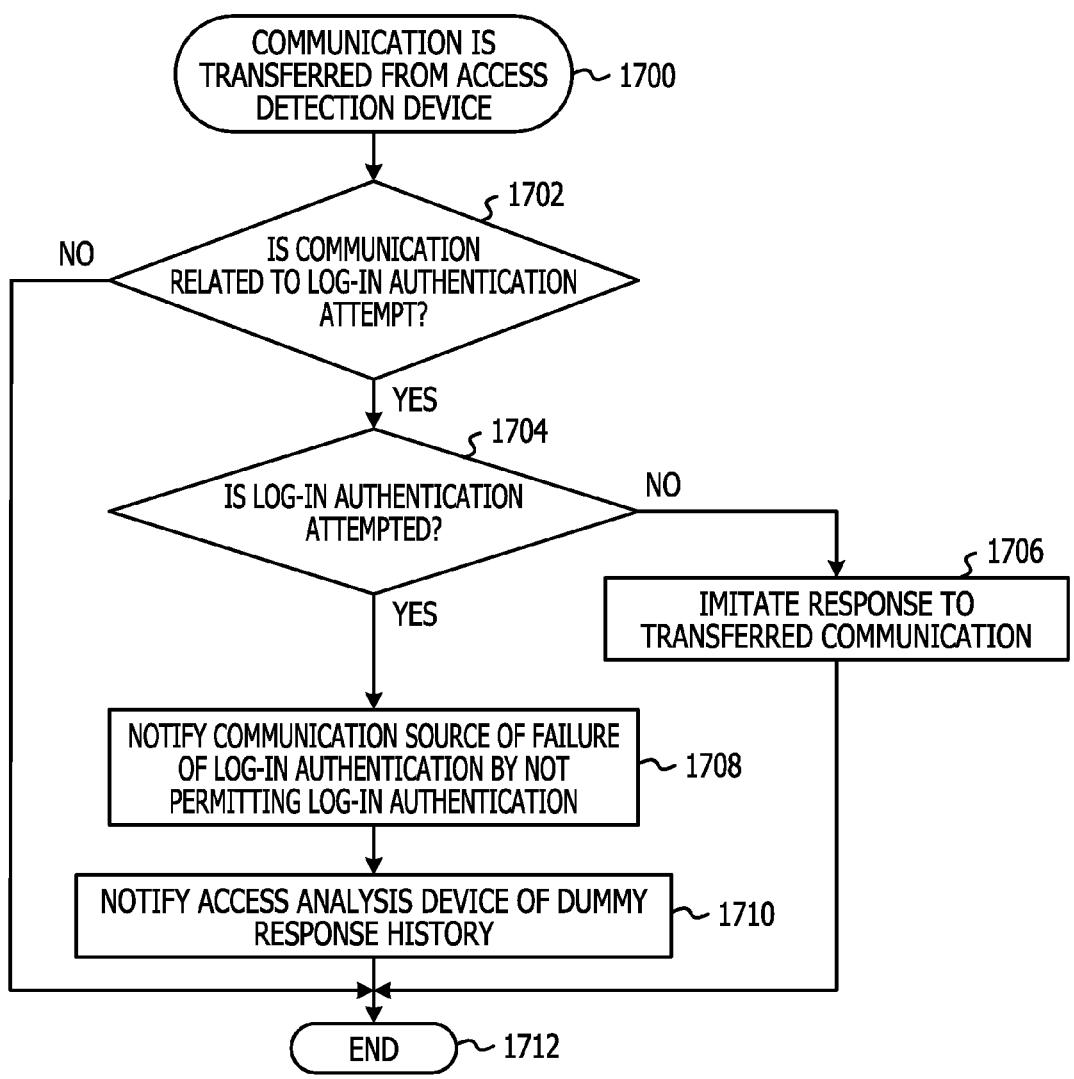
FIG. 17 illustrates a process conducted by the access prevention device of the embodiment.

FIG. 17 illustrates a process conducted by the access prevention device of the embodiment. A process illustrated in FIG. 17 is a process performed by the access prevention device 820 illustrated in FIG. 8. By a process 1700, the detecting unit 1100 illustrated in FIG. 11 detects that communication is transferred from the access detection device 810, and thereby the process illustrated in FIG. 17 is started. In addition, the communication detected by the detecting unit 1100 in the process 1700 is communication transferred by the access detection device 810 by the process 1506.

After the process 1700, a process 1702 that determines whether communication is related to an attempt of log-in authentication is performed by the determining unit 1110. In the process 1702, the content of the transferred communication is confirmed by the process 1504, and whether communication is related to an attempt of log-in authentication is determined. In a case where it is determined that the communication is related to the attempt of log-in authentication, the procedure moves to a process 1704, and in a case where it is not determined that the communication is not related to the attempt of log-in authentication, the procedure moves to a process 1712 and the process illustrated in FIG. 17 is terminated. In addition, a process related to the attempt of log-in authentication in the process 1702 is not just a process of log-in authentication based on an ID and a password, but, for example, means various communication conducted to attempt log-in authentication such as a process for establishing a communication session before the log-in authentication process.

After the process 1702, a process 1704 that determines whether log-in authentication is attempted is performed by the determining unit 1110. In the process 1704, by determining whether the transferred communication is a log-in authentication attempt based on an ID and a password, whether or not log-in authentication is attempted is determined. In addition, the reason that the process 1704 is distinguished from the process 1702 is that, even when the transferred process is a process related to the attempt of log-in authentication, it is not just a process of log-in authentication based on an ID and a password, but, for example, is a process for establishing a communication session before the log-in authentication process or the like. Therefore, such a process before a process is distinguished from a log-in authentication process itself. In the process 1704, in a case where it is determined that log-in authentication is attempted, the procedure moves to a process 1708, and in a case where it is not determined that log-in authentication is attempted, the procedure moves to a process 1706.

In a case in which it is not determined that log-in authentication is attempted in the process 1704, a process 1706 that imitates a response to the transferred communication is performed by the response unit 1120. In the process 1706, even though it is not determined that log-in authentication occurs in the process 1704, the process 1706 is performed for guiding up to the phase of attempting log-in authentication by the communication source in order to obtain the information of the destination of log-in authentication in which the communication source has an interest. In the process 1706, for example, a process for establishing a communication session or the like is imitated and responds to the communication source. In addition, when the process 1706 is terminated, the procedure moves to a process 1712 and the process illustrated in FIG. 17 is terminated.

In a case where it is determined in the process 1704 that the log-in authentication is attempted, a process 1708 that notifies the communication source of the failure of the log-in authentication by not being permitted is performed by the response unit 1120. In the process 1708, regardless of the number of communication notified from the access detection device 810, the log-in authentication is not permitted since the communication is from a candidate of an illegal access source recorded as a suspect of an attack source. In addition, a dummy response for notifying the communication source of the failure of the log-in authentication is performed.

A process 1710 that notifies the access analysis device of a dummy response history is performed by the notifying unit 1130. In the process 1710, an IP address of the communication source and the attempt time when the log-in authentication is attempted of the communication transferred from the access detection device 810 are recorded in relation to one another, and the access analysis device 830 is notified of these pieces of information. In addition, the dummy response history is illustrated in FIG. 18.

After the process 1710, a process 1 illustrated in FIG. 17 is terminated by a process 1712.

FIG. 18 illustrates an example of a dummy response of the embodiment. The dummy response history illustrated in FIG. 18 is an example of information sent from the access prevention device 820 to the access analysis device 830 by the process 1706 illustrated in FIG. 17. In the dummy response history, an IP address of the communication source to which a dummy response is sent by the process 1708 for attempting log-in authentication after the host scanning is recorded, and the attempt time when the log-in authentication is attempted is recorded in relation to one another. In FIG. 18, for example, the fact that a communication source identified as an IP address of "11. 22. 33. 44" attempts log-in authentication at "2014/4/1 0:00" is illustrated.

Figure 19:
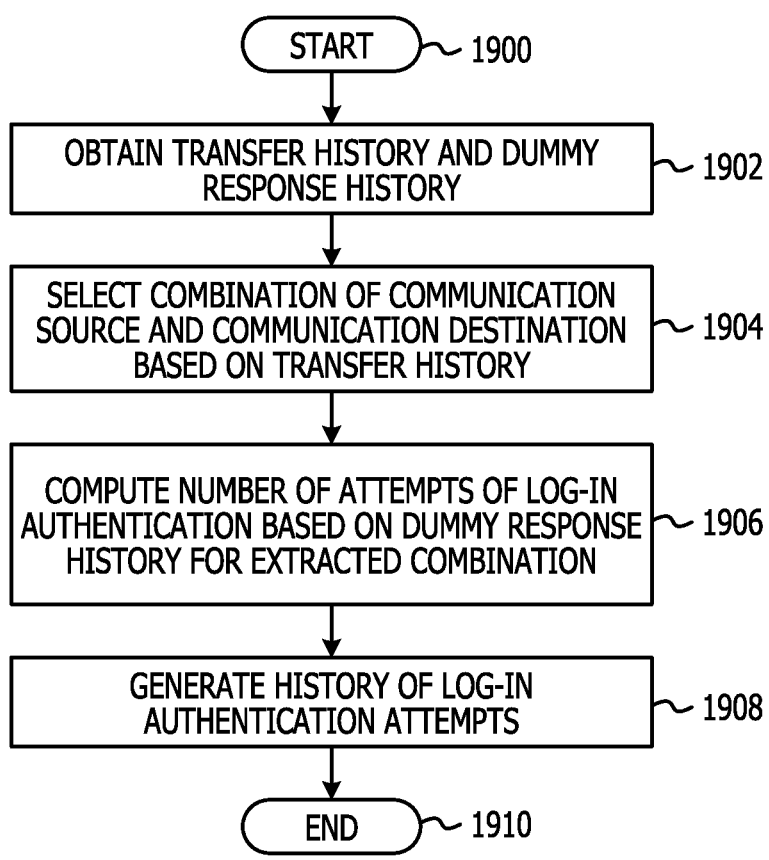
FIG. 19 illustrates a process conducted by the access analysis device of the embodiment.

FIG. 19 illustrates a process conducted by the access analysis device of the embodiment. A process illustrated in FIG. 19 is a process performed by the access analysis device 830 illustrated in FIG. 8, and is started by the process 1900.

A process 1902 that obtains the transfer history and dummy response history is performed by the obtaining unit 1200 illustrated in FIG. 12. In the process 1902, the transfer record notified by the access detection device 810 by the process 1506 is obtained. In addition, in the process 1902, the dummy response history notified by the access prevention device 820 by the process 1710 is obtained.

After the process 1902, a process 1904 that extracts a combination of a communication source and a communication destination based on the transfer history is performed by the extracting unit 1210. In the process 1904, the combination of the communication source and the communication destination transferred continuously during a certain period of time is selected based on the transfer history obtained by the process 1902. Describing the process 1904 along with an example of the transfer history illustrated in FIG. 16, the communication towards a communication destination identified by an IP address of "1. 1. 1. 2" from the communication source identified by an IP address of "11. 22. 33. 44" is transferred at "2014/4/1 0:00" and "2014/4/1/0:01". In addition, in the process 1904, the communication is determined as communication transferred continuously during a certain period of time and the combination of the communication source and the communication destination is extracted.

After the process 1904, with regard to the extracted combination, the process 1906 that counts the number of attempts of the log-in authentication based on the dummy response history is performed by the counting unit 1220. In the process 1906, the number of attempts of log-in authentication that are performed during the certain period of time is counted based on the dummy response history obtained by the process 1902. Describing the process 1906 along with the dummy response history illustrated in FIG. 18, the attempt of the log-in authentication by the communication source identified by an IP address of "11. 22. 33. 44" during a period from "2014/4/1 0:00" to "2014/4/1/0:01" and the number thereof is counted as 1. In this way, the transfer history in FIG. 16 and the dummy response history in FIG. 18 conflict with each other through the processes 1904 and 1906.

After the process 1906, a process 1908 that generates a history of log-in authentication attempts is performed by the generating unit 1230. In the process 1908, by receiving the result of the processes 1904 and 1906, the communication source, the communication destination, the attempt time of log-in authentication, and the number of attempt of log-in authentication in attempting the log-in authentication are related to each other, thereby generating a history of log-in authentication attempts. In addition, an example of the history of log-in authentication attempts is illustrated in FIG. 20.

FIG. 20 illustrates an example of a history of log-in authentication attempts. The information illustrated in FIG. 20 is information generated by the access prevention device 820 by the process 1908, in which the communication source, the communication destination, the attempt time of log-in authentication, and the number of attempts of log-in authentication in attempting the log-in authentication are related to each other. For example, a fact that the number of the attempts of log-in authentication performed with regard to the communication destination identified by an IP address of "1. 1. 1. 2" by the communication source identified by an IP address of "11. 22. 33. 44" is 10 times is illustrated. In addition, in FIG. 20, the time when the log-in authentication attempt is started is illustrated as an attempt time of the log-in authentication. However, the embodiment is not limited thereto, and for example, all times when the log-in authentication is attempted may be recorded.

Figure 21:
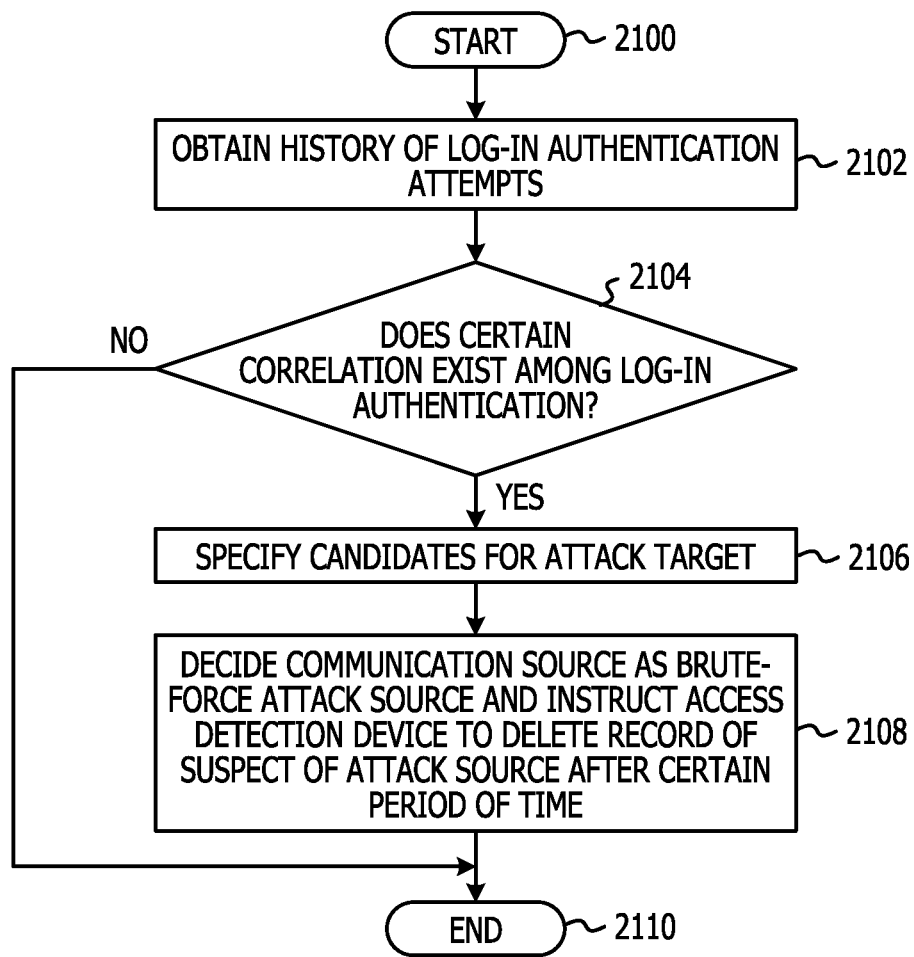
FIG. 21 illustrates another process conducted by the access analysis device of the embodiment.

FIG. 21 illustrates another process conducted by the access analysis device of the embodiment. A process illustrated in FIG. 19 is a process performed by the access analysis device 830 illustrated in FIG. 8, and is started by the process 2100.

A process 2102 that obtains the history of log-in authentication attempts is performed by the obtaining unit 1200 illustrated in FIG. 12. In the process 2102, the history of log-in authentication attempts generated by the process 1908 is obtained.

After the process 2102, a process 2104 that determines whether there is a correlation between log-in authentication is performed by the determining unit 1240. In the process 2104, in a case in which log-in authentication is attempted to a plurality of communication destinations by a certain communication source, even when log-in authentication to a different communication destination is performed, it is determined whether there is a correlation between these cases of log-in authentication. In other words, in the process 2104, the log-in authentication to the different communication destination is also a target to be decided. As described above, there is a characteristic that attacks are attempted to a plurality of attack destinations in approximately the same time zone for approximately the same number of times in the second aspect of the brute-force attack. Therefore, if a correlation between the number of attempts of log-in authentication and the attempt time of the log-in authentication is confirmed, it may be presumed that the attack source of the brute-force attack (the second aspect thereof) is highly likely to exist, and the communication source performs the determination of the process 2104 for the presumption. Specific examples of the process 2104 will be described along with FIG. 20.

As illustrated in FIG. 20, the communication source identified by an IP address of "11. 22. 33. 44" attempts log-in authentication for "10 times" from "2012/4/1 0:00" with regard to the communication destination identified by an IP address of "1. 1. 1. 2". Moreover, the communication source identified by the IP address of "11. 22. 33. 44" attempts log-in authentication for "9 times" from "2012/4/1 0:01" with regard to the communication destination identified by an IP address of "1. 1. 1. 3". Furthermore, the communication source identified by the IP address of "11. 22. 33. 44" attempts log-in authentication for "10 times" from "2012/4/1 0:00" with regard to the communication destination identified by an IP address of "1. 1. 1. 4". In addition, it is found that the log-in authentication with regard to these three communication destinations is attempted from approximately the same time for approximately the same number of times. Moreover, this tendency is a characteristic of the brute-force attack described above along with FIGS. 3, 4, and 5. In the case where this kind of correlation is confirmed, in the process 2104, it is determined that a certain correlation exists between log-in authentication, and the communication source is the attack source of the brute-force attack.

As an indicator for determining that there is a correlation, a correlation coefficient R described below may be used. The correlation coefficient R, for example, with the number of attempts of log-in authentication received by a communication destination $v_i$ being $X_i$, and the time of attempt of log-in authentication being t is defined as:

$$R = \frac{\sum_{i=1}^{n}(X_i - X_{av})(t_i - t_{av})}{\sqrt{\sum_{i=1}^{n}(X_i - X_{av})}\sqrt{\sum_{i=1}^{n}(t_i - t_{av})}}$$

Here, $X_{av}$ is the average of the number of attempts $X_i$, and $t_{av}$ is the average of the attempt time $t_i$. In addition, the number of attempts of log-in authentication may be the number of attempts of log-in authentication per unit time.

In addition, in a case in which a certain threshold is set for determining that the log-in authentication is attempted at approximately the same time for approximately the same number of times as described above, and the log-in authentication is attempted to a plurality of communication destinations by a certain communication source, by searching a combination of the communication destination $v_i$ which makes the correlation coefficient R a certain threshold or more, it may be determined whether there is a correlation between log-in authentication, and the combination of a plurality of communication destinations may be extracted which are the targets for the brute-force attack.

In addition, when the group of attack targets (a combination of a plurality of communication destinations) which is highly related to the number of attempts of log-in authentication and the attempt time of log-in authentication is extracted, the maximum clique method may be used.

Here, the maximum clique method will be described. A maximum clique problem is a kind of a combination optimization problem that selects one with the greatest size among complete graphs of partial graphs of undirected graphs. First, some of the terms will be defined. "Clique" is a set of summits that induces the complete graph. The complete graph is a graph in which a side exists between any two summits. "The maximum clique" is a clique in which the number of summits is in the maximum. The maximum clique method is a method that finds the greatest one among the cliques of a graph. One of the algorithms thereof is, first, to search a set of candidate nodes. The set of candidate nodes is a set of summits that returns to become a clique even when a clique held at a certain point is added. In addition, a clique with a number of summits increased by 1 is produced by adding a summit of the set of candidate nodes to the clique. This operation is repeated as much as possible to find the maximum clique.

Figure 22:
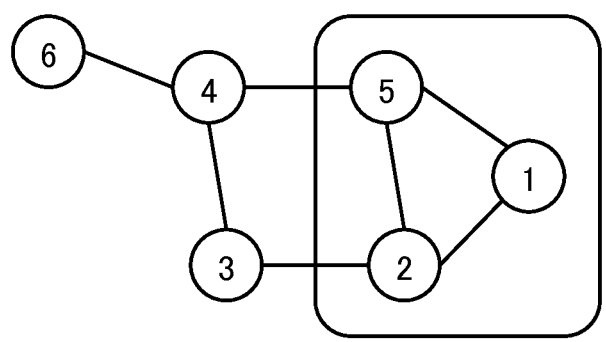
FIG. 22 is a view for illustrating an outline of a maximum clique method.

In FIG. 22, a figure is illustrated to describe the maximum clique method in a summarized manner. A graph illustrated in FIG. 22 includes six summits specified from 1 to 6. A summit 1 is bound with summits 2 and 5 by a side, the summit 2 is bound with summits 1, 3, and 5 by a side, the summit 3 is bound with summits 2 and 4 by a side, the summit 4 is bound with summits 3, 5, 6 by a side, and the summit 5 is bound with summits 1, 2, and 4 by a side. An example illustrated in FIG. 22 is an example in which a clique configured by the summits 1, 2, and 5 becomes the maximum clique.

In order to apply the maximum clique method to the problem specified as a group of attack destinations by extracting the attack targets with a high correlation efficient, the communication destinations for which log-in authentication are attempted are allocated at summits of the graph. Furthermore, at each summit of the graph, data related to the number of attempt of log-in authentication with regard to the corresponding communication destination, the attempt time, and the communication source is adapted.

In addition, to decide whether to bind the interval between summits of the graph by a side, the correlation related to the number of attempts of log-in authentication with regard to the corresponding communication destination and the attempt time are computed, and when the result is at a certain threshold or more, two summits are bound. Here, the correlation coefficient $R_2$ between the summit 1 in which the communication destination $v_1$ is allocated and the summit 2 in which the communication destination $v_2$ is allocated is computed to describe an example in which it is decided whether to bind the summits 1 and 2 by a side according to whether the correlation coefficient $R_2$ is at a certain threshold or more.

The correlation coefficient $R_2$, for example, with the number of the brute-force attack received by a communication device $v_i$ (i=1, 2) being $x_i$ and the detection time being t is computed by:

$$R_2 = \frac{\sum_{i=1}^{2}(X_i - X_{av})(t_i - t_{av})}{\sqrt{\sum_{i=1}^{2}(X_i - X_{av})^2}\sqrt{\sum_{i=1}^{2}(t_i - t_{av})^2}}$$

Here, $x_{av}$ is the average of the number of attempts $x_i$, and $t_{av}$ is the average of the attempt time $t_i$. In addition, the number of attempts of log-in authentication may be the number of attempts of log-in authentication per unit time.

In addition, as an alternative, in a case where the number of attempts of log-in authentication received by the communication destination $v_i$ is $x_i$, and the attempt time of log-in authentication is $t_i$, regarding the 2 communication destinations, when both the difference between $x_i$ and that between $t_i$ are within a certain range, the corresponding interval between the summits may be bound.

As described above, with regard to the attempt of log-in authentication from a certain source of communication, a pair of communication destinations highly related with the number of attempts of log-in authentication and the attempt time of log-in authentication is created. In a case where the correlation efficient is higher than a certain threshold, the summits allocated to the communication destinations are bound by a side. In addition, by performing this process between each communication destinations, the combination of communication destinations which is the maximum clique is specified. In addition, with regard to the combination of communication combinations, it may be determined that a certain correlation exists between log-in authentication, and a combination of communication combinations (a group of attack targets) performed at approximately the same time for approximately the same number of times as described above, which is a characteristic of the brute-force attack, may be specified.

Here, description returns to the process described in FIG. 21.

In a case where it is determined that there is a certain correlation between log-in authentication by the process 2104, a process 2106 that is specified as a candidate for attack targets is performed by the specifying unit 1250. In the process 2106, a plurality of communication destinations for which is determined that a correlation exists between the log-in authentication by the process 2104 is set as a group of attack targets that receives the brute-force attack from the source of communication that attempts the log-in authentication, and is specified as a group of candidates of attack targets that has a possibility of receiving the brute-force attack in the future. Describing an example along with FIG. 20, the communication destination identified by an IP address of "1. 1. 1. 2", the communication destination identified by an IP address of "1. 1. 1. 3", and the communication destination identified by an IP address of "1. 1. 1. 4" are a group of attack targets which receives the brute-force attack by the source of communication identified by an IP address of "11. 22. 33. 44", and are specified as a group of candidates of attack targets. In addition, in order to record that these communication destinations are the group of attack targets and the candidates of attack targets, the IP addresses thereof are recorded as illustrated in FIG. 23.

In FIG. 23, an example of a group of attack targets and a candidate for attack targets of the embodiment is illustrated. FIG. 23 is information recorded by the process 2106, and illustrates a group of attack targets that receives the brute-force attack. In FIG. 23, for example, it is illustrated that the communication destination identified by an IP address of "1. 1. 1. 2", the communication destination identified by an IP address of "1. 1. 1. 3", and the communication destination identified by an IP address of "1. 1. 1. 4" belong to the group of attack targets identified by a number "1".

In addition, the IP address of the communication source recorded by the process 2106 as described above is used in a process 2402 described below as information for specifying candidates for confirming log-in authentication also attempted by another communication source. In such meaning, the group of attack targets illustrated in FIG. 23 may also be candidates for attack targets (candidates of illegal access destinations) which have a possibility of receiving an illegal access again in the future. In addition, in the embodiment, while the brute-force attack is defended against by the process 1708 and the like, information of the group of candidates of illegal access destinations is obtained. As described above, in the brute-force attack (the second aspect thereof), a standard for protecting attack targets in an early stage when attacked again is recorded by the process 2106 since the brute-force attack has a characteristic that attempts attacks continuously to the part or entirety of the group of attack destinations to which an attack is attempted.

Here, description returns to the process illustrated in FIG. 21.

A process 2108 that decides a communication source as the brute-force attack source and instructs the access detection device to delete the record as the suspect of attack source after a certain period of time is performed by the deciding unit 1260. The process 2108 is a process in which the communication source of log-in authentication for which it is decided that a certain correlation exists between log-in authentication by the process 2104 is deleted from the record being recorded as a suspect of attack source after a certain period of time. In addition, the instruction by the process 2108 is received by the deletion unit 1060 of the access detection device 810, and the IP address of the suspect of the attack source is removed from the database by the deletion unit 1060.

Therefore, the reason that the process 2108 is performed is that, as described above, the second aspect of the brute-force attack has a characteristic that attempts attacks while changing the IP address of the attack source, in other words, the IP address recorded as the IP address of the suspect of the attack source after a certain period of time may not be used, thus it is not desired to be recorded in the database in advance.

In the second aspect of the brute-force attack, there is an attack conducted again with the IP address of the attack source changing. Therefore, a large database is desired for recording the IP addresses of the entire attack source. By reversing the characteristic of the second aspect of the brute-force attack, in the case where a certain amount of time passes, the recorded IP address of the suspect of the attack source is removed from the database, and the memory usage used in the database is suppressed by the process 2108.

By the process 2110, a process illustrated in FIG. 21 is terminated.

Here, processes 1508 and 1510 illustrated in FIG. 15 will be described.

The process 1508 that determines whether the communication source is the communication source which was determined to be an illegal access source by the access analysis device is performed by the determining unit 1020. The case in which it is determined the communication source is an illegal access source by the access analysis device is described below.

In a case where it is not determined that the communication source is an illegal access source by the access analysis device in the process 1508, the process 1510 that notifies the access analysis device of the communication source and the communication destination as access information is performed by the notifying unit 1040. In the process 1510, the access analysis device 830 is notified of the IP address for identifying the communication source and the IP address for identifying the communication destination.

Figure 24:
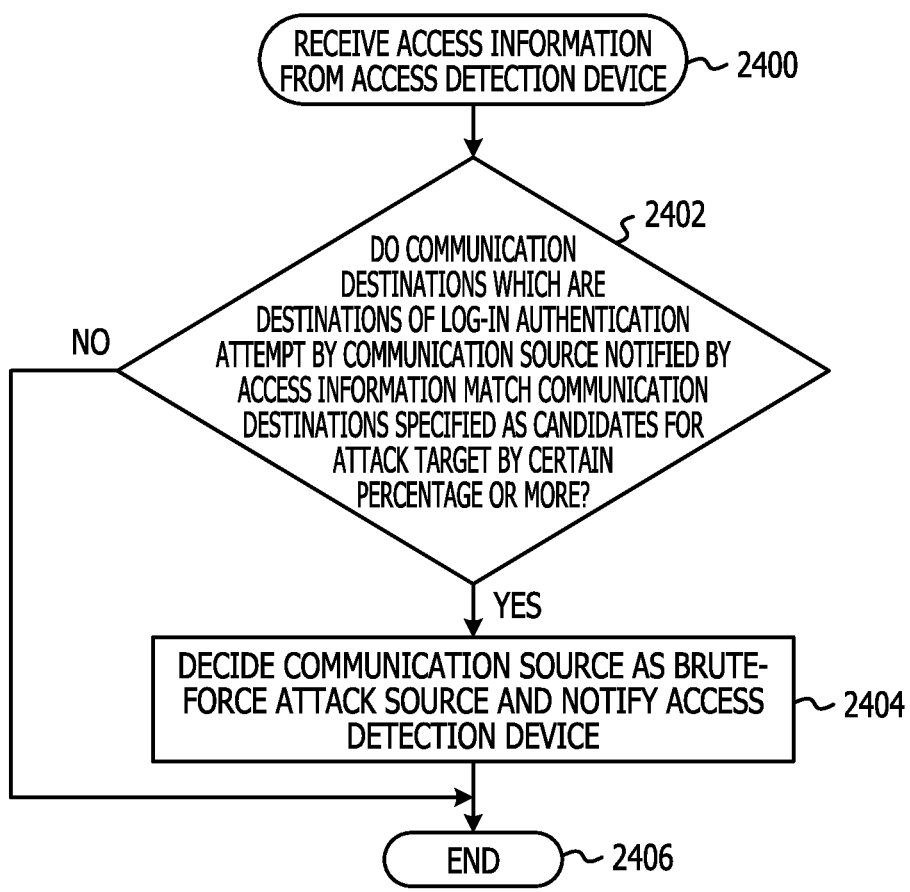
FIG. 24 illustrates another process conducted by the access analysis device of the embodiment.

FIG. 24 illustrates another process conducted by the access analysis device of the embodiment. A process illustrated in FIG. 24 is a process performed by the access analysis device 830, and is a process for determining that the attacker of the brute-force attack attacked again by a using communication source even when, in contrast, the communication source does not perform host scanning. The process illustrated in FIG. 24 is started by a process 2400 that receives access information sent from the access detection device 810.

After the process 2400, a process 2402 that determines whether a plurality of communication destinations which are destinations of log-in authentication attempts by the communication source notified by the access information is identical to a plurality of communication destinations specified as candidates for the attack target by a certain percentage or more is performed by the determining unit 1240. In the process 2402, the IP address of the communication destination that is the destination of log-in authentication attempts by the notified communication source is accumulated by access information notified again through the processes 1508 and 1510, and it is determined whether the group of communication destinations which are destinations of log-in authentication attempts is identical to a plurality of communication destinations belonging to the group of attack destinations specified by the process 2106 by a certain percentage or more.

As described above, in the second aspect of the brute-force attack, an attack is continuously attempted with the IP address of the communication source changing. When attacking again, the attacker may not perform host scanning when changing the IP address of the communication source but attempts log-in authentication since a computer in which once the host scanning is performed and the traffic of the communication is confirmed may be specified. However, as described above, in the second aspect of the brute-force attack, the percentage of the group of attack targets which are identical is high even when the IP address of the communication source is changed. In the process 2402, even when the IP address of the communication source is not recorded, the destination of log-in authentication attempts is continuously monitored, and in the case where the destination is identical to a plurality of communication sources belonging to candidates for attack targets specified by the process 2106 by a certain percentage or more, it is determined that the communication source is a re-attack source and an illegal access source. In addition, the certain percentage may be appropriately set based on the characteristic of the brute-force attack.

In a case where the communication source is identical by a certain percentage or more in the process 2402, a process 2404 that notifies the access detection device of the communication source as the brute-force attack source is performed by the deciding unit 1260. In the process 2404, the communication source determined by the process 2402 is the attack source of a re-attack that the attacker performed by changing the attack source. Even when the host scanning is not performed by the communication source, it is decided as the brute-force attack source (an illegal access source) and the access detection device 810 is notified thereof.

By the process 2406, a process illustrated in FIG. 24 is terminated.

Here, the process 1512 illustrated in FIG. 15 will be described.

In a case where it is determined that the communication source is an illegal access source by the access analysis device in the process 1508, a process 1512 that performs countermeasures with regard to the communication from the communication source is performed by the executing unit 1050. In the process 1512, the communication source detected by the process 1500 is specified as an illegal access source by the processes 2302 and 2304 performed by the access analysis device 830. Therefore, countermeasures such as cutting the communication from the communication source for a certain period of time are taken. In addition, countermeasures in the process 1512 may be performed by the access prevention device 820.

In addition, in the above embodiment, an example is described in which the combination of an ID and a password that identify a computer is attempted to be extorted by attempting log-in authentication as the brute-force attack. However, the embodiment is not limited to this example. For example, the idea of the technique herein may also be applied to a cyber attack that extorts data from the computer, a system, or a network, causes damage or the like to the data, or makes the computer, the system, or the network incompetent by illegally intruding the computer, the system, or the network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus comprising:
    a memory; and
    a processor coupled to the memory and configured to
        detect a communication source device that transmits a plurality of ping commands addressed to a plurality of first devices within a given time period,
        record the plurality of first devices specified by the plurality of ping commands transmitted from the detected communication source device,
        determine whether a correlation exists among a plurality of first authentication requests for the plurality of first devices from the communication source device,
        decide that the communication source device is an attack source of a cyber attack and the plurality of first devices are attack targets by the cyber attack in a case where the correlation exists,
        control to discard the plurality of first authentication requests for the plurality of first devices generated by the communication source device after the plurality of ping commands, and control to invalidate a second authentication request transmitted from another communication source device different from the communication source device detected as a communication source of the plurality of ping commands, provided that the second authentication request is addressed to at least one of the plurality of first devices.

2. The apparatus according to claim 1, wherein the processor is configured to
record identification information for identifying the communication source device in the memory in a case where the plurality of ping commands by the communication source device is detected, and
delete the identification information from the memory after a period of time which is set corresponding to a kind of the cyber attack in a case where the communication source device is detected to be the attack source.

3. The apparatus according to claim 1, wherein the processor is configured to
decide, in a case where a plurality of second devices as targets of a plurality of second authentication requests conducted by the another communication source device match the plurality of first devices which are specified as candidates for the attack targets by a certain percentage or more, that the another communication source device is the attack source.

4. The apparatus according to claim 1, wherein the processor is configured to
notify the communication source device that the authentication requests are discarded.

5. The apparatus according to claim 1, wherein
the cyber attack is a brute-force attack for obtaining authentication information.

6. The apparatus according to claim 1, wherein
each authentication request is a log-in authentication request by an ID and a password.

7. A method comprising:
detecting a communication source device that transmits a plurality of ping commands addressed to a plurality of first devices within a given time period;
recording the plurality of first devices specified by the plurality of ping commands transmitted from the detected communication source device;
determining whether a correlation exists among a plurality of first authentication requests for the plurality of first devices from the communication source device;
deciding that the communication source device is an attack source of a cyber attack and the plurality of first devices are attack targets by the cyber attack in a case where the correlation exists;
controlling to discard the plurality of first authentication requests generated by the communication source device after the plurality of ping commands; and
controlling to invalidate a second authentication request transmitted from another communication source device different from the communication source device detected as a communication source of the plurality of ping commands, provided that the second authentication request is addressed to at least one of the plurality of first devices.

8. The method according to claim 7, further comprising:
recording identification information for identifying the communication source device in the memory in a case where the plurality of ping commands by the communication source device is detected, and
deleting the identification information from the memory after a period of time which is set corresponding to a kind of the cyber attack in a case where the communication source device is detected to be the attack source.

9. The method according to claim 7, further comprising:
deciding, in a case where a plurality of second devices as targets of a plurality of second authentication requests conducted by the another communication source device match the plurality of first devices which are specified as candidates for the attack targets by a certain percentage or more, that the another communication source device is the attack source.

10. The method according to claim 7, further comprising:
notifying the communication source device that the authentication requests are discarded.

11. The method according to claim 7, wherein
the cyber attack is a brute-force attack for obtaining authentication information.

12. The method according to claim 7, wherein
each authentication request is a log-in authentication request by an ID and a password.

13. An apparatus comprising:
a memory; and
a processor coupled to the memory and configured to
detect a communication source device that transmits a plurality of pings commands to a plurality of first devices within a given time period,
record the plurality of first devices specified by the plurality of ping commands transmitted from the detected communication source device,
determine whether a correlation exists among a plurality of first authentication requests for the plurality of first devices from the communication source device,
specify that the communication source device is an attack source of a cyber attack and the plurality of first devices which are targets of the plurality of first authentication requests by the communication source device are attack targets of the cyber attack, and
control to invalidate a second authentication request transmitted from another communication source device different from the communication source device detected as a communication source of the plurality of ping commands, provided that the second authentication request is addressed to at least one of the plurality of first devices.

* * * * *